United States Patent
Hosseini et al.

(10) Patent No.: US 10,652,069 B2
(45) Date of Patent: May 12, 2020

(54) RESOURCE ELEMENT GROUP MAPPING FOR A DOWNLINK CONTROL CHANNEL

(71) Applicant: QUALCOMM Incorporated, San Diego, CA (US)

(72) Inventors: Seyedkianoush Hosseini, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/168,794

(22) Filed: Oct. 23, 2018

(65) Prior Publication Data
US 2019/0132180 A1 May 2, 2019

Related U.S. Application Data

(60) Provisional application No. 62/577,703, filed on Oct. 26, 2017.

(51) Int. Cl.
| | |
|---|---|
| *H04K 1/10* | (2006.01) |
| *H04L 27/26* | (2006.01) |
| *H04L 5/00* | (2006.01) |
| *H04W 72/04* | (2009.01) |

(52) U.S. Cl.
CPC ........ *H04L 27/2666* (2013.01); *H04L 5/0007* (2013.01); *H04L 5/0051* (2013.01);
(Continued)

(58) Field of Classification Search
CPC . H04L 27/2666; H04L 5/0007; H04L 5/0051; H04L 5/0053; H04L 27/2605;
(Continued)

(56) References Cited

U.S. PATENT DOCUMENTS

| | | | |
|---|---|---|---|
| 8,908,651 B2* | 12/2014 | Noh | H04L 1/0083 370/335 |
| 2012/0213163 A1* | 8/2012 | Lee | H04L 1/1861 370/329 |

OTHER PUBLICATIONS

Ericsson: "Design Aspects of sPDCCH", 3GPP Draft; R1-1717162 Design Aspects of SPDCCH, 3rd Generation Partnership Project (3GPP), Mobile Competence Centre; 650, Route Des Lucioles; F-06921, Sophia Antipolis Cedex; France, vol. RAN WG1, No. Prague, Czech Republic; Oct. 9, 2017-Oct. 13,2017, Oct. 8, 2017 (Oct. 8, 2017), 13 Pages, XP051340352, Retrieved from the Internet: URL: http://www.3gpp.org/ftp/Meetings_3GPP_SYNC/RAN1/ Docs/ [retrieved on Oct. 8, 2017].

(Continued)

*Primary Examiner* — Helene E Tayong
(74) *Attorney, Agent, or Firm* — Holland & Hart LLP

(57) ABSTRACT

Methods, systems, and devices for wireless communications are described. A transmitting node, such as a base station, may transmit downlink control information (DCI) to a user equipment (UE) using a number of shortened control channel elements (sCCEs). Each sCCE may consist of a number of shortened resource element groups (sREGs). The base station may map each sCCE to one or more sREGs using a mapping function to ensure that each sCCE is mapped to a unique set of sREGs (e.g., no single sREG is allocated to more than one sCCE). Use of the mapping function may further ensure that each sREG mapped to an sCCE is within a single symbol. The transmitting node may also configure a set of resource blocks (RBs) corresponding to the sREGs such that the number of RBs per symbol is an integer multiple of the number of sREGs per sCCE.

20 Claims, 13 Drawing Sheets

(52) U.S. Cl.
CPC ........ *H04L 5/0053* (2013.01); *H04L 27/2605* (2013.01); *H04L 27/2626* (2013.01); *H04L 27/2647* (2013.01); *H04W 72/042* (2013.01); *H04L 5/005* (2013.01); *H04L 5/0041* (2013.01)

(58) Field of Classification Search
CPC ... H04L 27/2647; H04L 5/0041; H04L 5/005; H04W 72/042
USPC .......................................................... 375/260
See application file for complete search history.

(56) References Cited

OTHER PUBLICATIONS

International Search Report and Written Opinion—PCT/US2018/057378—ISA/EPO—dated Feb. 12, 2019.

LG Electronics: "Consideration on Multiplexing sPDCCH with data", 3GPP Draft; R1-1717252 Consideration on Multiplexing SPDCCH with Data, 3rd Generation Partnership Project (3GPP), Mobile Competence Centre; 650, Route Des Lucioles; F-06921 Sophia-Antipolis Cedex; vol. RAN WG1, No. Prague, Czech Republic; Oct. 9, 2017-Oct. 13, 2017, Oct. 8, 2017 (Oct. 8, 2017), 4 Pages, XP051340443, Retrieved from the Internet: URL: http://www.3gpp.org/ftp/Meetings_3GPP_SYNC/RAN1/Docs/ [retrieved on Oct. 8, 2017].

Qualcomm Incorporated: "Search Space Design for sTTI Operation", 3GPP Draft; R1-1712780 Search Space for STTI Operation, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017 (Aug. 20, 2017), 10 Pages, XP051315592, Retrieved from the Internet: URL: http://www.3gpp.org/ftp/Meetings_3GPP_SYNC/RAN1/Docs/ [retrieved on Aug. 20, 2017].

\* cited by examiner

RESOURCE ELEMENT GROUP MAPPING FOR A DOWNLINK CONTROL CHANNEL

CROSS REFERENCES

The present Application for Patent claims the benefit of U.S. Provisional Patent Application No. 62/577,703 by HOSSEINI et al., entitled "RESOURCE ELEMENT GROUP MAPPING FOR A DOWNLINK CONTROL CHANNEL," filed Oct. 26, 2017, which is assigned to the assignee hereof and expressly incorporated herein by reference.

BACKGROUND

The following relates generally to wireless communication, and more specifically to resource element group mapping for a downlink control channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipments (UEs). In some wireless communications systems (e.g., NR systems), a base station may communicate with a UE on a carrier using shortened transmission time intervals (sTTIs). The base station may transmit a downlink control channel within the sTTI to schedule downlink transmissions or uplink transmissions within the sTTI. In some cases, the base station may transmit downlink control information (DCI) using shortened control channel elements (sCCEs). Each sCCE may be made up of one or more shortened resource element groups (sREGs). Techniques for mapping sREGs to sCCEs may be desired.

SUMMARY

In some wireless communications systems, a base station may transmit downlink control information (DCI) to a user equipment (UE) in a search space of a shortened transmission time interval (sTTI) using a particular aggregation level. The aggregation level may correspond to the number of shortened control channel elements (sCCEs) used to transmit the DCI in the search space. Each sCCE may be made up of one or more shortened resource element groups (sREGs). The base station may configure a set of resource blocks (RBs) to carry the sCCEs, which may be referred to as a shortened physical downlink control channel resource block set (sPDCCH RB set). Each sREG may correspond to some number of RBs within the sPDCCH RB set, and the base station may map the sREGs in the sPDCCH RB set to the sCCEs.

A method of wireless communication is described. The method may include identifying control information for transmission on a downlink control channel RB set that is configured with one or more orthogonal frequency-division multiplexing (OFDM) symbols, encoding the control information into a set of control channel elements (CCEs), mapping each CCE of the set of CCEs to a corresponding unique set of resource element groups (REGs) in the downlink control channel RB set using a mapping function such that the set of REGs is unique regardless of a number of OFDM symbols on which the downlink control channel RB set is configured, and where each of the one or more OFDM symbols is configured with a set of REGs, and transmitting the encoded control information using the downlink control channel RB set.

An apparatus for wireless communication is described. The apparatus may include a processor, memory in electronic communication with the processor, and instructions stored in the memory. The instructions may be executable by the processor to cause the apparatus to identify control information for transmission on a downlink control channel RB set that is configured with one or more OFDM symbols, encode the control information into a set of CCEs, map each CCE of the set of CCEs to a corresponding unique set of REGs in the downlink control channel RB set using a mapping function such that the set of REGs is unique regardless of a number of OFDM symbols on which the downlink control channel RB set is configured, and where each of the one or more OFDM symbols is configured with a set of REGs, and transmit the encoded control information using the downlink control channel RB set.

Another apparatus for wireless communication is described. The apparatus may include means for identifying control information for transmission on a downlink control channel RB set that is configured with one or more OFDM symbols, encoding the control information into a set of CCEs, mapping each CCE of the set of CCEs to a corresponding unique set of REGs in the downlink control channel RB set using a mapping function such that the set of REGs is unique regardless of a number of OFDM symbols on which the downlink control channel RB set is configured, and where each of the one or more OFDM symbols is configured with a set of REGs, and transmitting the encoded control information using the downlink control channel RB set.

A non-transitory computer-readable medium storing code for wireless communication is described. The code may include instructions executable by a processor to identify control information for transmission on a downlink control channel RB set that is configured with one or more OFDM symbols, encode the control information into a set of CCEs, map each CCE of the set of CCEs to a corresponding unique set of REGs in the downlink control channel RB set using a mapping function such that the set of REGs is unique regardless of a number of OFDM symbols on which the downlink control channel RB set is configured, and where each of the one or more OFDM symbols is configured with a set of REGs, and transmit the encoded control information using the downlink control channel RB set.

In some examples of the method, apparatuses, and non-transitory computer-readable medium described herein, mapping each CCE of the set of CCEs may include operations, features, means, or instructions for mapping each CCE of the set of CCEs such that each corresponding set of REGs may be fully contained within a single OFDM symbol of the one or more OFDM symbols.

Some examples of the method, apparatuses, and non-transitory computer-readable medium described herein may further include operations, features, means, or instructions for allocating the downlink control channel RB set over the one or more OFDM symbols such that the set of REGs in each OFDM symbol may be a multiple of a number of the set of CCEs.

In some examples of the method, apparatuses, and non-transitory computer-readable medium described herein, the mapping function may include a floor function of a CCE index divided by a number of the set of CCEs to be included in each OFDM symbol of the one or more OFDM symbols.

In some examples of the method, apparatuses, and non-transitory computer-readable medium described herein, the mapping function may be:

$$n \bmod CCE_{OS} + \left\lfloor \frac{n}{CCE_{OS}} \right\rfloor \cdot N_{sREG,m}^{OS} + i \cdot CCE_{OS}$$

where $$CCE_{OS} = \left\lfloor \frac{N_{sREG,m}^{OS}}{N_{sREG}^{sCCE}} \right\rfloor$$

and indicates the number of the set of CCEs to be included in each OFDM symbol, $N_{sREG,m}^{OS}$ indicates a number of the set of REGs to be included in each OFDM symbol, and $N_{sREG}^{sCCE}$ indicates a number of REGs to be included in each CCE, where $n \in \{0, 1, \ldots, k \cdot CCE_{OS}-1\}$, and k is a number of OFDM symbols on which the downlink control channel RB set is configured, and where $i \in \{0, 1, \ldots, N_{sCCE,m}-1\}$, and $N_{sCCE,m}$ indicates a number of the set of CCEs in the downlink control channel RB set.

In some examples of the method, apparatuses, and non-transitory computer-readable medium described herein, transmitting the encoded control information using the downlink control channel RB set may include operations, features, means, or instructions for transmitting the encoded control information on a cell-specific reference signal (CRS)-based PDCCH.

A method of wireless communication is described. The method may include receiving a downlink control channel resource block (RB) set that includes a set of control channel elements (CCEs) in one or more orthogonal frequency-division multiplexing (OFDM) symbols; de-mapping the set of CCEs from the downlink control channel RB set based on a mapping function, where each CCE is assigned to a corresponding unique set of resource element groups (REGs) in the downlink control channel RB set by the mapping function independent of a number of OFDM symbols on which the downlink control channel RB set is received and where each of the one or more OFDM symbols is configured with multiple REGs; and decoding the set of CCEs into control information. In some examples, the mapping function is a predetermined mapping function.

An apparatus for wireless communication is described. The apparatus may include a processor, memory in electronic communication with the processor, and instructions stored in the memory. The instructions may be executable by the processor to cause the apparatus to receive a downlink control channel resource block (RB) set that includes a set of control channel elements (CCEs) in one or more orthogonal frequency-division multiplexing (OFDM) symbols; de-map the set of CCEs from the downlink control channel RB set based on a mapping function, where each CCE is assigned to a corresponding unique set of resource element groups (REGs) in the downlink control channel RB set by the mapping function independent of a number of OFDM symbols on which the downlink control channel RB set is received and where each of the one or more OFDM symbols is configured with multiple REGs; and decode the set of CCEs into control information.

Another apparatus for wireless communication is described. The apparatus may include means for receiving a downlink control channel resource block (RB) set that includes a set of control channel elements (CCEs) in one or more orthogonal frequency-division multiplexing (OFDM) symbols; de-mapping the set of CCEs from the downlink control channel RB set based on a mapping function, where each CCE is assigned to a corresponding unique set of resource element groups (REGs) in the downlink control channel RB set by the mapping function independent of a number of OFDM symbols on which the downlink control channel RB set is received and where each of the one or more OFDM symbols is configured with multiple REGs; and decoding the set of CCEs into control information.

A non-transitory computer-readable medium storing code for wireless communication is described. The code may include instructions executable by a processor to receive a downlink control channel resource block (RB) set that includes a set of control channel elements (CCEs) in one or more orthogonal frequency-division multiplexing (OFDM) symbols; de-map the set of CCEs from the downlink control channel RB set based on a mapping function, where each CCE is assigned to a corresponding unique set of resource element groups (REGs) in the downlink control channel RB set by the mapping function independent of a number of OFDM symbols on which the downlink control channel RB set is received and where each of the one or more OFDM symbols is configured with multiple REGs; and decode the set of CCEs into control information.

In some examples of the method, apparatuses, and non-transitory computer-readable medium described herein, de-mapping the set of CCEs may include operations, features, means, or instructions for de-mapping the CCEs to the corresponding unique set of REGs, wherein the mapping function includes a floor function of a CCE index divided by a number of the set of CCEs included in each of the one or more OFDM symbols.

In some examples of the method, apparatuses, and non-transitory computer-readable medium described herein, the mapping function may be:

$$n \bmod CCE_{OS} + \left\lfloor \frac{n}{CCE_{OS}} \right\rfloor \cdot N_{sREG,m}^{OS} + i \cdot CCE_{OS}$$

where $$CCE_{OS} = \left\lfloor \frac{N_{sREG,m}^{OS}}{N_{sREG}^{sCCE}} \right\rfloor$$

and indicates the number of the set of CCEs to be included in each OFDM symbol, $N_{sREG,m}^{OS}$ indicates a number of the set of REGs to be included in each OFDM symbol, and $N_{sREG}^{sCCE}$ indicates a number of REGs to be included in each CCE, where $n \in \{0, 1, \ldots, k \cdot CCE_{OS}-1\}$, and k is a number of OFDM symbols on which the downlink control channel RB set is configured, and where $i \in \{0, 1, \ldots, N_{sCCE,m}-1\}$, and $N_{sCCE,m}$ indicates a number of the set of CCEs in the downlink control channel RB set.

In some examples of the method, apparatuses, and non-transitory computer-readable medium described herein, receiving the encoded control information using the downlink control channel RB set may include operations, features, means, or instructions for receiving the encoded control information on a cell-specific reference signal (CRS)-based PDCCH.

DETAILED DESCRIPTION

In some wireless communications systems, a base station may transmit downlink control information (DCI) to a user equipment (UE) in a search space of a shortened transmission time interval (sTTI) using a particular aggregation level. The aggregation level may correspond to the number of shortened control channel elements (sCCEs) used to transmit the DCI in the search space of the UE. Each sCCE may consist of one or more shortened resource element groups (sREGs). The base station may configure a set of resource blocks (RBs) to carry the sCCEs, which may be referred to as a shortened physical downlink control channel resource block set (sPDCCH RB set). Each sREG may correspond to some number of RBs within the sPDCCH RB set, and the base station may map the sREGs in the sPDCCH RB set to the sCCEs.

In some cases, the sPDCCH RB set may span more than one orthogonal frequency-division multiplexing (OFDM) symbol—e.g., the sPDCCH RB set may comprise a certain number of subcarriers in a first symbol as well as in a second symbol—which may be referred to as a distributed sPDCCH RB set. A mapping function may be used to ensure that, even in the case of a distributed sPDCCH RB set, each sCCE is mapped to a unique set of sREGs within the search space of a given UE (e.g., no single sREG is allocated to more than one sCCE). Further, each sREG corresponding to a given sCCE may be ensured to be within a single symbol of the distributed sPDCCH RB set, which may provide latency benefits. Further, the sPDCCH RB set may be configured such that the number of RBs per symbol is an integer multiple of the number of sREGs per sCCE, which may provide resource efficiency benefits.

Aspects of the disclosure are initially described in the context of a wireless communications system. Examples of resource element group mappings for a downlink control channel are then described. Aspects of the disclosure are further illustrated by and described with reference to apparatus diagrams, system diagrams, and flowcharts that relate to resource element group mapping for a downlink control channel.

Figure 1:
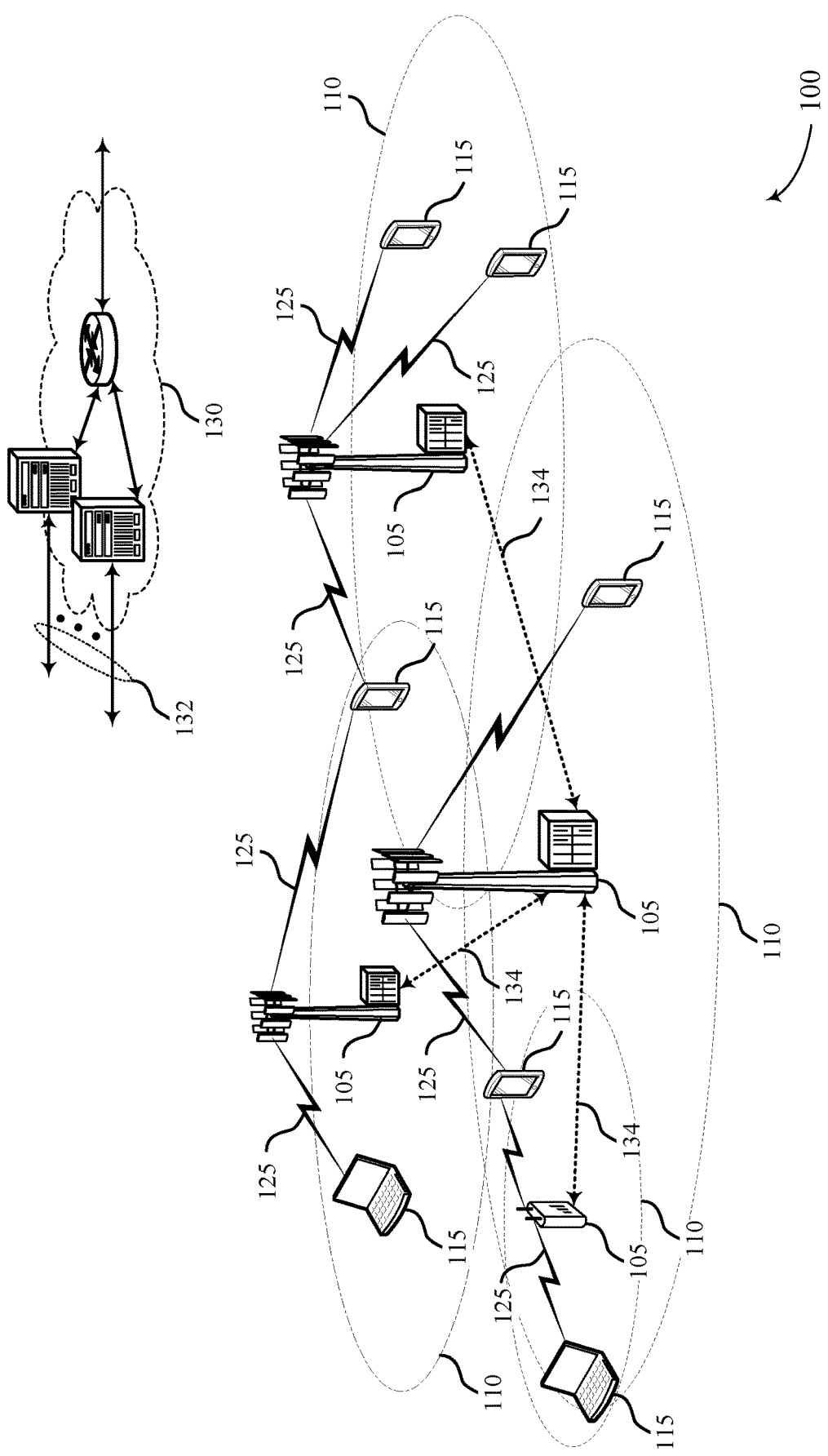
FIG. 1 illustrates an example of a system for wireless communication that supports resource element group mapping for a downlink control channel in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The communication links 125 between a UE 115 and base station 105 may be or represent an organization of physical resources, such as time and frequency resources. A basic unit of time and frequency may be referred to as a RE. A RE may consist of one symbol period and one subcarrier (e.g., a 15 KHz frequency range). In some wireless communications systems (e.g., LTE systems), a resource block may include 12 consecutive subcarriers in the frequency domain and, for a normal cyclic prefix in each orthogonal frequency-division multiplexing OFDM symbol, 7 consecutive OFDM symbols in the time domain (1 slot), or 84 REs. In other wireless communications systems (e.g., low latency systems), a resource block may include 12 consecutive subcarriers in the frequency domain and one (1) symbol in the time domain, or 12 REs. The number of bits carried by each RE may depend on the modulation scheme (the configuration of symbols that may be selected during each symbol period). Thus, the more resource blocks that a UE receives and the higher the modulation scheme, the higher the data rate may be.

In wireless communications system 100, a transmission time interval (TTI) may be defined as the smallest unit of time in which a base station 105 may schedule a UE 115 for uplink or downlink transmissions. As an example, a base station 105 may allocate one or more TTIs for downlink communication with a UE 115. The UE 115 may then monitor the one or more TTIs to receive downlink signals from the base station 105. In some wireless communications systems (e.g., LTE), a subframe may be the basic unit of scheduling or TTI. In other cases, such as with low latency operation, a different, reduced-duration TTI (e.g., an sTTI) may be used. Wireless communications system 100 may employ various TTI durations.

In some cases, an sTTI may contain fewer symbols (e.g., OFDM symbols) than a subframe (e.g., fewer than 7 symbols), including as few as one symbol. The sTTI may include a control channel (e.g., an sPDCCH)) used to schedule downlink or uplink communication on a data channel (e.g., a physical downlink shared channel (PDSCH)) within the sTTI. In other words, the sTTI may be self-contained. The sPDCCH may utilize sCCEs, which may each comprise some number of sREGs, to carry DCI. In some cases, each sCCE may consist of 4 sREGs, and each sREG may consist of one RB that may, for example, consist of 12 subcarriers within one OFDM symbol.

The number of sCCEs used to transmit an sPDCCH may be referred to as an aggregation level, and the sCCEs monitored by a receiving device (e.g., a UE 115) at an aggregation level for an sPDCCH may be referred to as an sPDCCH candidate (or aggregation level candidate). In some cases, a base station 105 may transmit cell-specific reference signals (CRSs) to a UE 115, and the UE 115 may use these CRSs to perform channel estimation for decoding DCI received in an sPDCCH from the base station 105. In such cases, the sPDCCH may be referred to as a CRS-based sPDCCH.

The number of RBs and symbols used for control signaling (e.g., used as a control channel) may be configured by higher layer signaling. In some cases, a base station 105 may configure a set of RBs for a group of sCCEs, which may be referred to as an sPDCCH RB set. Conventional solutions for mapping sCCEs to sREGs within an sPDCCH RB set may account only for the case in which the sPDCCH RB set spans only a single symbol—e.g., may account only for the case in which each RB within the sPDCCH RB set is within the same symbol. An sPDCCH RB set that spans only a single symbol may be referred to as a localized sPDCCH RB set.

In a localized sPDCCH RB set, sREGs within the sPDCCH RB set may be indexed in order of increasing or decreasing frequency—e.g., such that the highest frequency sREG in the set may have index i=0, the next-highest frequency sREG in the set may have index i=1, and so on, or such that the lowest frequency sREG in the set may have index i=0, the next-lowest frequency sREG in the set may have index i=1, and so on.

For a localized sPDCCH RB set, the following mapping function may provide the sREG index corresponding to an sCCE having index n:

$$n \bmod \left\lfloor \frac{N_{sREG,m}^{os}}{N_{sREG}^{sCCE}} \right\rfloor + \left\lfloor \frac{n \cdot N_{sREG}^{sCCE}}{N_{sREG,m}^{os}} \right\rfloor \cdot N_{sREG,m}^{os} + i \cdot \left\lfloor \frac{N_{sREG,m}^{os}}{N_{sREG}^{sCCE}} \right\rfloor \quad (1)$$

where:
n is the sCCE index, where $n \in \{0, 1, \ldots, N_{sCCE,m}-1\}$;
$N_{sCCE,m}$ is the number of sCCEs in the RB set;
i is the sREG index within a single sCCE, where $i \in \{0, \ldots, N_{sREG}^{sCCE}-1\}$;
$N_{sREG}^{sCCE}$ is the number of sREG per sCCE; and
$N_{sREG,m}^{os}$ is the number of sREGs per symbol in the sPDCCH RB set having index m.

Equation (1) may not, however, properly map sREGs within an sPDCCH RB set to sCCEs when the sPDCCH RB set spans more than one symbol—e.g., when the sPDCCH RB set is a distributed sPDCCH RB set. For example, consider a distributed sPDCCH RB set configured to include two (2) symbols, with ten (10) sREGs per symbol, and to carry four sCCEs (that is, $N_{sCCE,m}$ equal to 4).

In such an sPDCCH RB set:
$n \in \{0, 1, \ldots, 3\}$
$i \in \{0, 1, \ldots, 3\}$
$N_{sREG,m}^{os}=10$
$N_{sREG}^{sCCE}=4$ Using mapping function (1), for an sPDCCH RB set having index m:
sCCE0 consists of sREGs having indices 0, 2, 4, and 6;
sCCE1 consists of sREGs having indices 1, 3, 5, and 7;
sCCE2 consists of sREGs having indices 0, 2, 4, and 6; and
sCCE3 consists of sREGs having indices 11, 13, 15, and 17.

Thus, mapping function (1) maps the same set of sREGs with the distributed sPDCCH RB set to both sCCE0 and sCCE2; that is, sCCE0 and sCCE2 are not each mapped to a unique set of sREGs. Using overlapping resources for different DCI messages corresponding to different sCCEs is undesirable as it effectively reduces the number of sCCEs from four to three.

Figure 2:
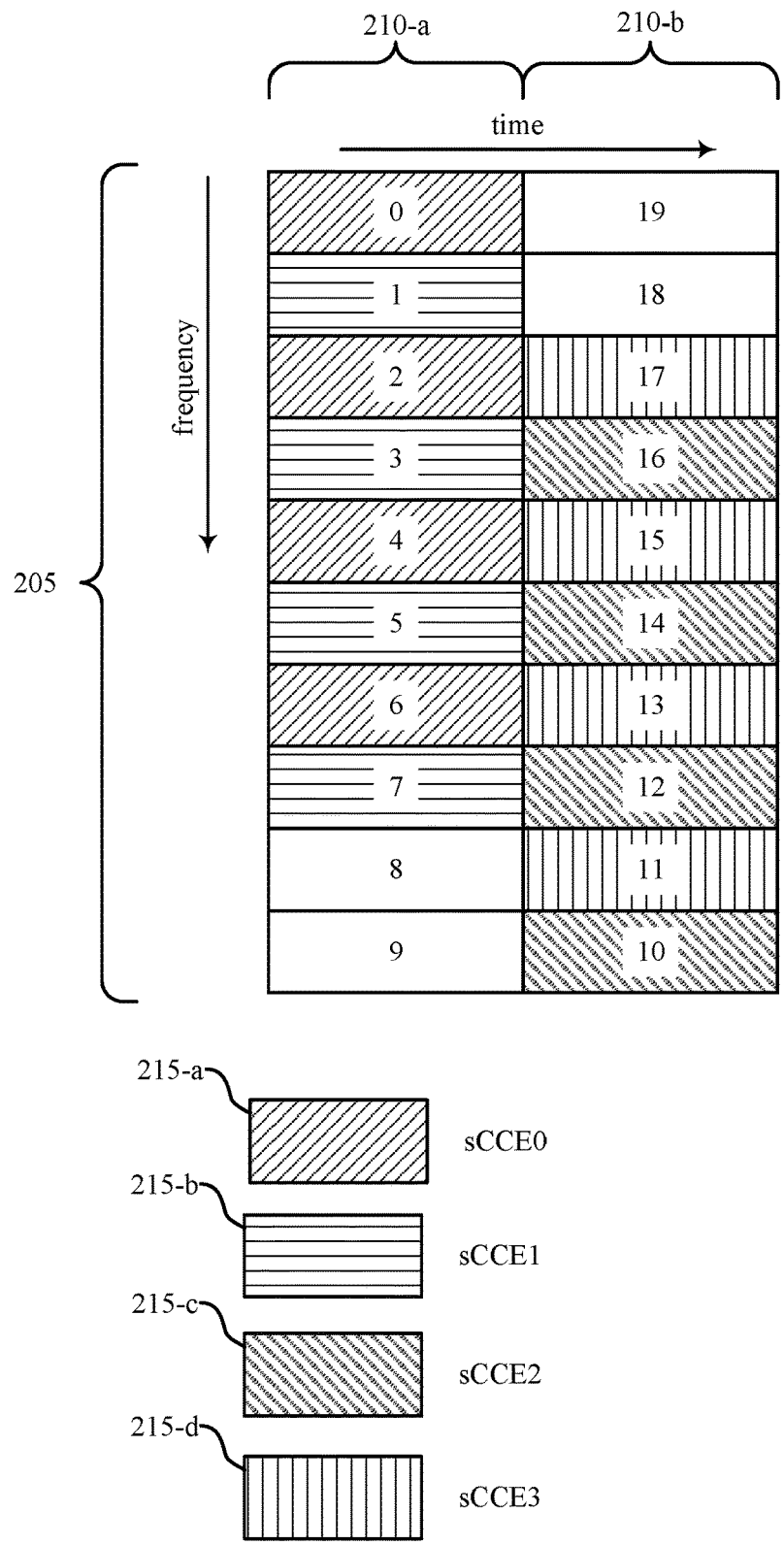
FIG. 2 illustrates an example of a resource element group mapping for a downlink control channel that supports resource element group mapping for a downlink control channel in accordance with aspects of the present disclosure.

FIG. 2 illustrates an example of a resource element group mapping 200 in accordance with various aspects of the present disclosure. In some examples, resource element group mapping 200 may be implemented aspects of wireless communications system 100, such as base stations 105.

Mapping 200 includes sPDCCH RB set 205. A transmitting node (e.g., base station 105) may configure the sPDCCH RB set 205 as a distributed sPDCCH RB set that includes (e.g., spans) two symbols, a first symbol 210-a and a second symbol 210-b. The first symbol 210-a and the second symbol 210-b may each be OFDM symbols. The first symbol 210-a and the second symbol 210-b may each comprise ten (10) sREGs and thus also ten (10) corresponding RBs, as each sREG may consist of one (1) RB.

In a distributed sPDCCH RB set, such as sPDCCH RB set 205, sREGs may be indexed within the sPDCCH RB set in a frequency-first, time-second order from 0 to $N_{os}^{X_m} \cdot N_{RB}^{X_m}-1$, where $N_{os}^{X_m}$ is the number of symbols included in the sPDCCH RB set having index m, and $N_{RB}^{X_m}$ is the number of RBs for the sPDCCH RB set having index m. Thus, in sPDCCH RB set 205, as $N_{os}^{X_m}$ is two (2) and $N_{RB}^{X_m}$ is twenty (20), the sREGs with sPDCCH RB set 205 may be indexed from 0-19, with the first symbol 210-a including sREGs having indices 0-9, and the second symbol 210-b including sREGs having indices 10-19. Further, the frequency-first, time-second mapping of the sREGs within an sPDCCH set may be performed from lower RB to higher RB for a first symbol, from higher RB to lower RB for a second symbol, and so on, as illustrated in mapping 200.

A transmitting node in a wireless communications system, such as a base station 105 in wireless communications system 100 may configure an sPDCCH RB set such as sPDCCH RB set 205 in order to transmit DCI to a receiving node, such as a UE 115 or other base station 105. In the example of mapping 200, the DCI comprises four (4) sCCEs: sCCE0 215-a, sCCE1 215-b, sCCE2 215-c, and sCCE3 215-d.

In some cases, the transmitting node (e.g., the base station 105) may use the following mapping function to assign a unique set of sREGs to each sCCE:

$$n \bmod \left\lfloor \frac{N_{sREG,m}^{os}}{N_{sREG}^{sCCE}} \right\rfloor + \left\lfloor \frac{n}{\left\lfloor \frac{N_{sREG,m}^{os}}{N_{sREG}^{sCCE}} \right\rfloor} \right\rfloor \cdot N_{sREG,m}^{os} + i \cdot \left\lfloor \frac{N_{sREG,m}^{os}}{N_{sREG}^{sCCE}} \right\rfloor$$

which may be simplified as $$n \bmod CCE_{os} + \left\lfloor \frac{n}{CCE_{os}} \right\rfloor \cdot N_{sREG,m}^{os} + i \cdot CCE_{os} \quad (2)$$

where:
$N_{sREG}^{sCCE}$ is the number of sREG per sCCE;
$N_{sREG,m}^{os}$ is the number of sREGs per symbol in the sPDCCH RB set having index m $$CCE_{os} = \left\lfloor \frac{N_{sREG,m}^{os}}{N_{sREG}^{sCCE}} \right\rfloor$$

n is the sCCE index, where $n \in \{0, 1, \ldots, k \cdot CCE_{os}-1\}$;

k is the number of configured symbols for the RB set; and
i is the sREG index within a single sCCE, where
$i \in \{0, \ldots, N_{sREG}^{sCCE}-1\}$;

In the example of sPDCCH RB set 205:
$N_{sREG}^{sCCE}=4$
$N_{sREG,m}^{os}=10$
$CCE_{os}=2$
$n \in \{0, 1, \ldots, 3\}$
$i \in \{0, 1, \ldots, 3\}$
$k=2$ Using mapping function (2), for the example sPDCCH RB set 205:
sCCE0 215-a consists of sREGs having indices 0, 2, 4, and 6;
sCCE1 215-b consists of sREGs having indices 1, 3, 5, and 7;
sCCE2 215-c consists of sREGs having indices 10, 12, 14, and 16; and
sCCE3 215-d consists of sREGs having indices 11, 13, 15, and 17.

Thus, mapping function (2) maps a unique set of sREGs to each sCCE (e.g., where each set of sREGs includes different indices), even for a distributed sPDCCH RB set such as sPDCCH RB set 205. Enabling the use of distributed sPDCCH RB sets with uniquely mapped sCCEs may beneficially improve the flexibility with which a scheduler at a transmitting node (e.g., a scheduler at a base station 105) may allocate resources for the purposes of DCI transmissions via an sPDCCH, which may in turn improve resource efficiency (e.g., efficiency with respect to time, frequency, code, spatial, spectrum, or other resources).

Also, as illustrated in mapping 200, use of mapping function (2) causes each sREG that is mapped to a given sCCE to be located within a single symbol. For example, each sREG mapped to sCCE0 215-a is within first symbol 210-a, each sREG mapped to sCCE1 215-b is within first symbol 210-a, each sREG mapped to sCCE2 215-c is within second symbol 210-b, and each sREG mapped to sCCE3 215-d is within second symbol 210-b. Mapping sREGs to sCCEs such that each sREG that is mapped to a given sCCE is within a single symbol may beneficially reduce latency because a receiving device (e.g., a UE 115) may be able to decode the DCI carried by a given sCCE without waiting for a subsequent symbol. For example, a UE 115 may be able to decode sCCE 215-a and sCCE 215-b prior to receiving the second symbol 210-b.

Further, as also illustrated in mapping 200, use of mapping function (2) results in each sREG that is mapped to a given sCCE being adjacent to an sREG having the same sREG index (e.g., same value of i) for an sCCE having an index that is either one less or one more than the index of the given sCCE. For example, the first (i=1) sREG mapped to sCCE0 215-a is sREG 0, and the first (i=1) sREG mapped to sCCE1 215-b is sREG 1. As another example, the third (i=3) sREG mapped to sCCE2 215-c is sREG 14, and the third (i=3) sREG mapped to sCCE4 215-d is sREG 15. Thus, for example, when aggregation levels greater than 1 are used, the ith sREGs of different sCCEs forming a decoding candidate may be consecutive. This may beneficially improve the ability of a receiving device (e.g., a UE 115) to estimate channel quality, as a shortened precoding resource group (sPRG) may be of size 2, and such a mapping may ensure the receiving device can always use an entire sPRG for estimating channel quality when aggregation levels greater than 1 are used—e.g., use of mapping function (2) may avoid assigning to a receiving device an sPRG having only a single utilized RB.

Figure 3:
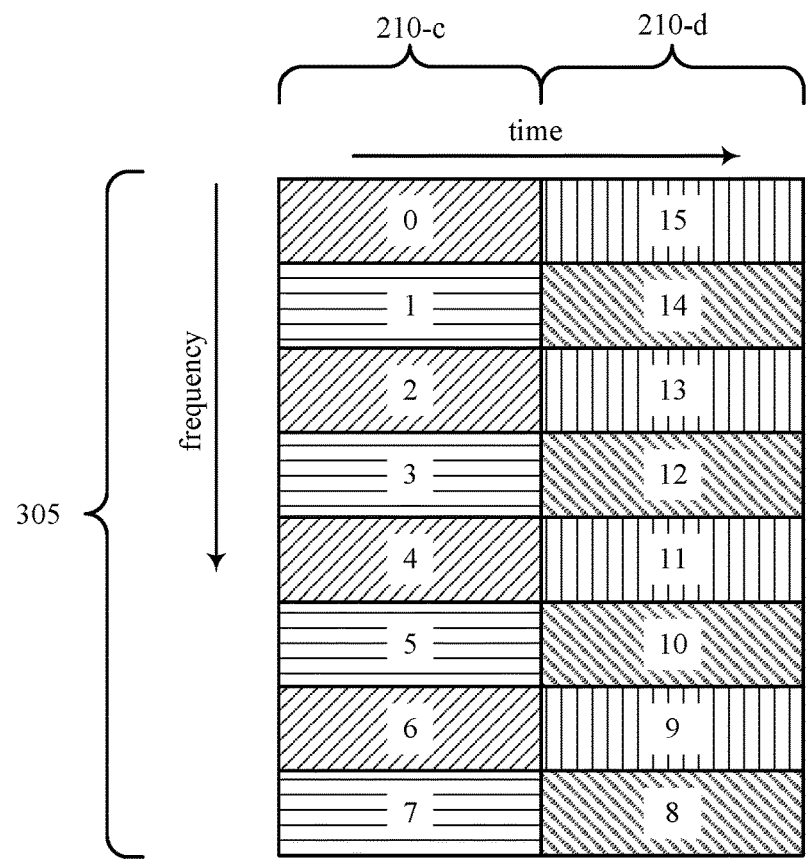
FIG. 3 illustrates an example of a resource element group mapping for a downlink control channel that supports resource element group mapping for a downlink control channel in accordance with aspects of the present disclosure.
Figure 3:
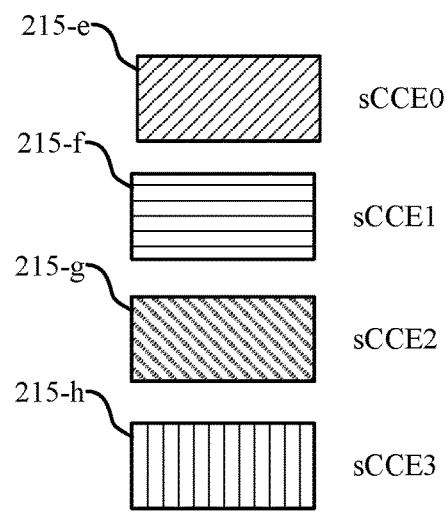

FIG. 3 illustrates an example of an additional resource element group mapping 300 in accordance with various aspects of the present disclosure. In some examples, resource element group mapping 300 may be implemented aspects of wireless communications system 100, such as base stations 105.

As shown in mapping 200, two sREGs in each of the first symbol 210-a and the second symbol 210-b were unused—specifically, sREGs 8 and 9 in the first symbol 210-a and sREGs 18 and 19 in the second symbol 210-b were unused. In some cases, a transmitting node in a wireless communications system, such as a base station 105 in wireless communications system 100, may configure an sPDCCH RB set using mapping function (2) and also configure the sPDCCH RB such that the number of sREGs per symbol is an integer multiple of the number of sREGs per sCCE. That is, the transmitting node may configure the sPDCCH RB such that $N_{sREG,m}^{os}=q \cdot N_{sREG}^{sCCE}$, where q is a positive integer.

Mapping 300 includes sPDCCH RB set 305. A transmitting node (e.g., base station 105) may configure the sPDCCH RB set 305 as a distributed sPDCCH RB set that includes (e.g., spans) two symbols, a first symbol 210-c and a second symbol 210-d. The first symbol 210-c and a second symbol 210-d may each be OFDM symbols. The number of sREGs per sCCE may be four (4), and thus the transmitting node may configure the first symbol 210-a and the second symbol 210-b to each comprise eight (8) sREGs, setting q equal to 2.

In the example, of mapping 300, the DCI comprises four (4) sCCEs: sCCE0 215-e, sCCE1 215-f, sCCE2 215-g, and sCCE3 215-3. The transmitting node (e.g., the base station 105) may use mapping function (2) to assign a unique set of sREGs to each sCCE. In the example of sPDCCH RB set 305:
$N_{sREG}^{sCCE}=4$
$N_{sREG,m}^{os}=8$
$CCE_{os}=2$
$n \in \{0, 1, \ldots, 3\}$
$i \in \{0, 1, \ldots, 3\}$
$k=2$ Using mapping function (2), for the example sPDCCH RB set 305:
sCCE0 215-e consists of sREGs having indices 0, 2, 4, and 6;
sCCE1 215-f consists of sREGs having indices 1, 3, 5, and 7;
sCCE2 215-g consists of sREGs having indices 8, 10, 12, and 14; and
sCCE3 215-h consists of sREGs having indices 9, 11, 13, and 15.

As illustrated in mapping 300, configuring an sPDCCH RB set such that the number of sREGs per symbol is an integer multiple of the number of sREGs per sCCE may enable the use of each RB within the sPDCCH RB set, which may beneficially improve resource efficiency (e.g., efficiency with respect to time, frequency, code, spatial, spectrum, or other resources).

Figure 4:
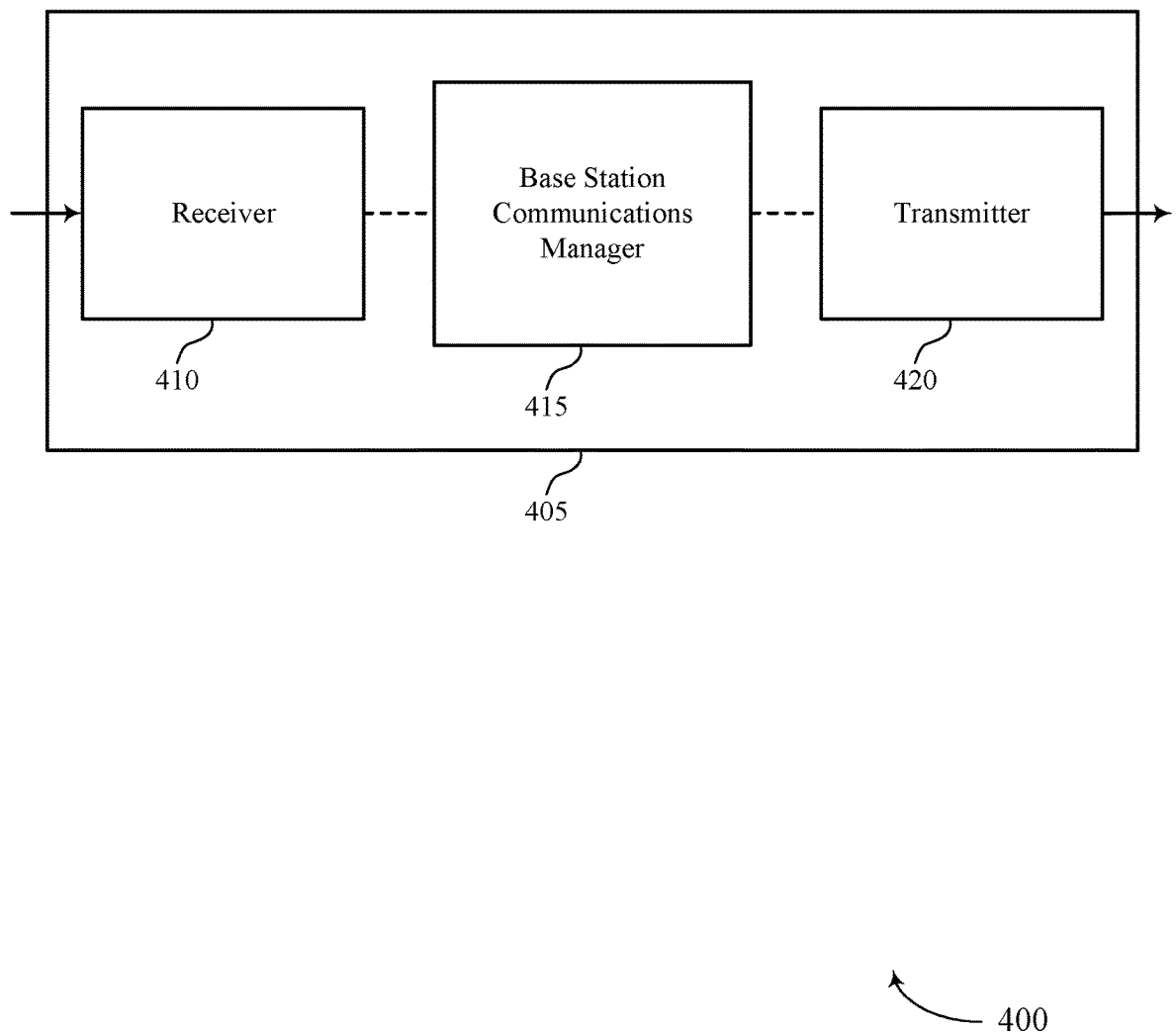
FIGS. 4 through 6 show block diagrams of a device that supports resource element group mapping for a downlink control channel in accordance with aspects of the present disclosure.

FIG. 4 shows a block diagram 400 of a wireless device 405 that supports resource element group mapping for a downlink control channel in accordance with aspects of the present disclosure. Wireless device 405 may be an example of aspects of a base station 105 as described herein. Wireless device 405 may include receiver 410, base station communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to resource element group mapping for a downlink control channel, etc.). Information may be passed on to other components of the device. The receiver 410 may be an example of aspects of the transceiver 735 described with reference to FIG. 7. The receiver 410 may utilize a single antenna or a set of antennas.

Base station communications manager 415 may be an example of aspects of the base station communications manager 715 described with reference to FIG. 7. Base station communications manager 415 and/or at least some of its various sub-components may be implemented in hardware, software executed by a processor, firmware, or any combination thereof. If implemented in software executed by a processor, the functions of the base station communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 415 and/or at least some of its various sub-components may be physically located at various positions, including being distributed such that portions of functions are implemented at different physical locations by one or more physical devices. In some examples, base station communications manager 415 and/or at least some of its various sub-components may be a separate and distinct component in accordance with various aspects of the present disclosure. In other examples, base station communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 415 may identify control information for transmission on a downlink control channel RB set that is configured with one or more OFDM symbols, encode the control information into a set of CCEs, map each CCE of the set of CCEs to a corresponding unique set of REGs in the downlink control channel RB set using a mapping function such that the set of REGs is unique regardless of a number of OFDM symbols on which the downlink control channel RB set is configured, and where each of the one or more OFDM symbols is configured with a set of REGs, and transmit the encoded control information using the downlink control channel RB set. In some examples, the mapping function may be a predetermined mapping function known to the base station and the UE.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
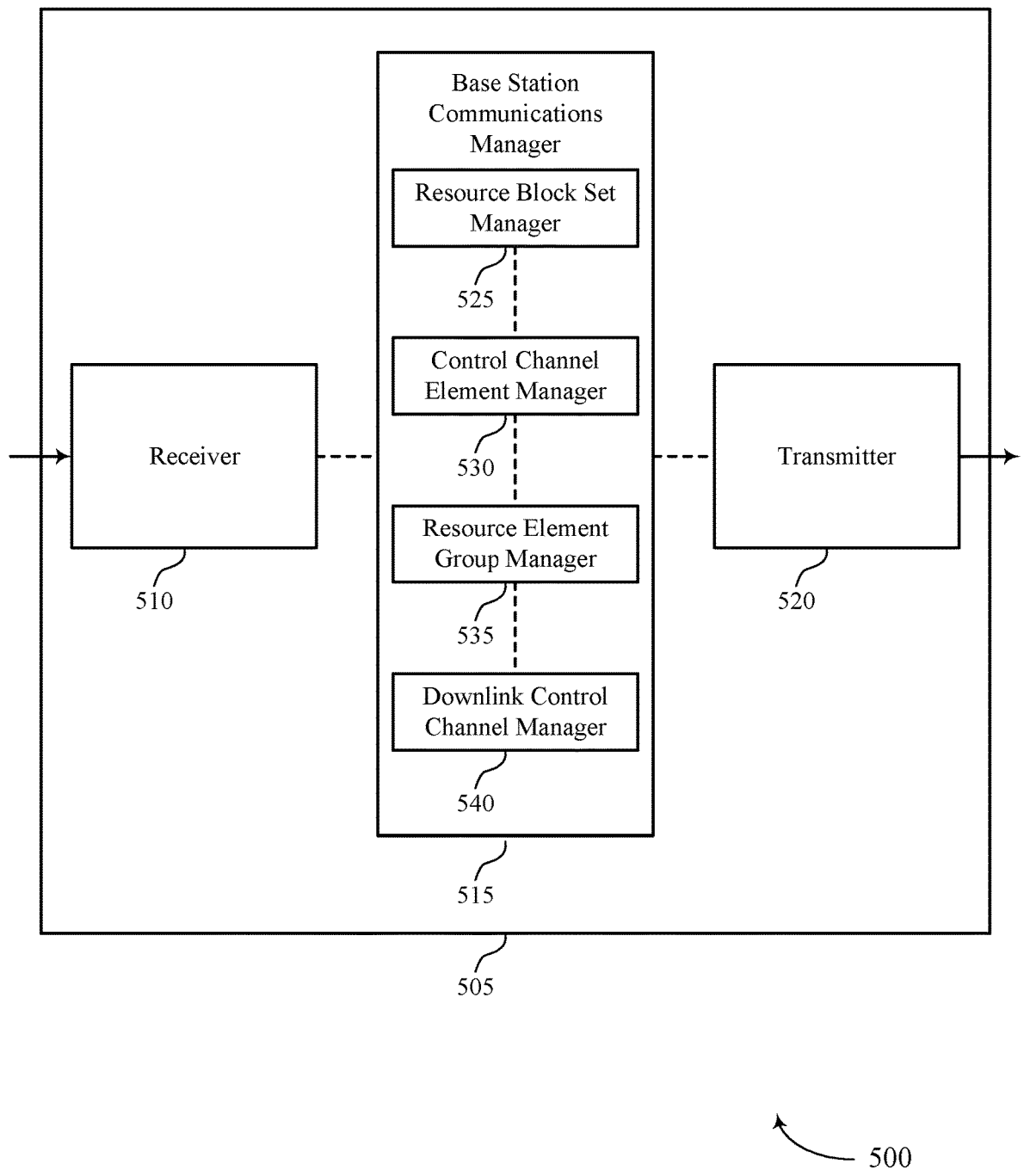

FIG. 5 shows a block diagram 500 of a wireless device 505 that supports resource element group mapping for a downlink control channel in accordance with aspects of the present disclosure. Wireless device 505 may be an example of aspects of a wireless device 405 or a base station 105 as described with reference to FIG. 4. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to resource element group mapping for a downlink control channel, etc.). Information may be passed on to other components of the device. The receiver 510 may be an example of aspects of the transceiver 735 described with reference to FIG. 7. The receiver 510 may utilize a single antenna or a set of antennas.

Base station communications manager 515 may be an example of aspects of the base station communications manager 715 described with reference to FIG. 7. Base station communications manager 515 may also include resource block set manager 525, control channel element manager 530, resource element group manager 535, and downlink control channel manager 540.

Resource block set manager 525 may identify control information for transmission on a downlink control channel RB set that is configured with one or more OFDM symbols.

Control channel element manager 530 may encode the control information into a set of CCEs.

Resource element group manager 535 may map each CCE of the set of CCEs to a corresponding unique set of REGs in the downlink control channel RB set using a mapping function such that the set of REGs is unique regardless of a number of OFDM symbols on which the downlink control channel RB set is configured, and where each of the one or more OFDM symbols is configured with a set of REGs. Resource element group manager 535 may allocate the downlink control channel RB set over the one or more OFDM symbols such that the set of REGs in each OFDM symbol is a multiple of a number of the set of CCEs. In some cases, mapping each CCE of the set of CCEs includes mapping each CCE of the set of CCEs such that each set of REGs is fully contained within a single OFDM symbol of the one or more OFDM symbols. In some examples, the mapping function may be a predetermined mapping function known to the base station and the UE.

In some cases, the mapping function includes a floor function of a CCE index divided by a number of the set of CCEs to be included in each OFDM symbol. In some cases, the mapping function is $$n \bmod CCE_{OS} + \left\lfloor \frac{n}{CCE_{OS}} \right\rfloor \cdot N_{sREG,m}^{OS} + i \cdot CCE_{OS},$$

where $$CCE_{OS} = \left\lfloor \frac{N_{sREG,m}^{OS}}{N_{sREG}^{sCCE}} \right\rfloor$$

and indicates the number of the set of CCEs to be included in each OFDM symbol, $N_{sREG,m}^{OS}$ indicates a number of the set of REGs to be included in each OFDM symbol, and $N_{sREG}^{sCCE}$ indicates a number of REGs to be included in each CCE, where $n \in \{0, 1, \ldots, k \cdot CCE_{OS}-1\}$, and k is a number of the OFDM symbols on which the downlink control channel RB set is configured, and where $i \in \{0, 1, \ldots, N_{sCCE,m}-1\}$, and $N_{sCCE,m}$ indicates a number of the set of CCEs in the downlink control channel RB set.

Downlink control channel manager 540 may transmit the encoded control information using the downlink control channel RB set. In some cases, transmitting the encoded control information using the downlink control channel RB set includes transmitting the encoded control information on a CRS-based physical downlink control channel (PDCCH).

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
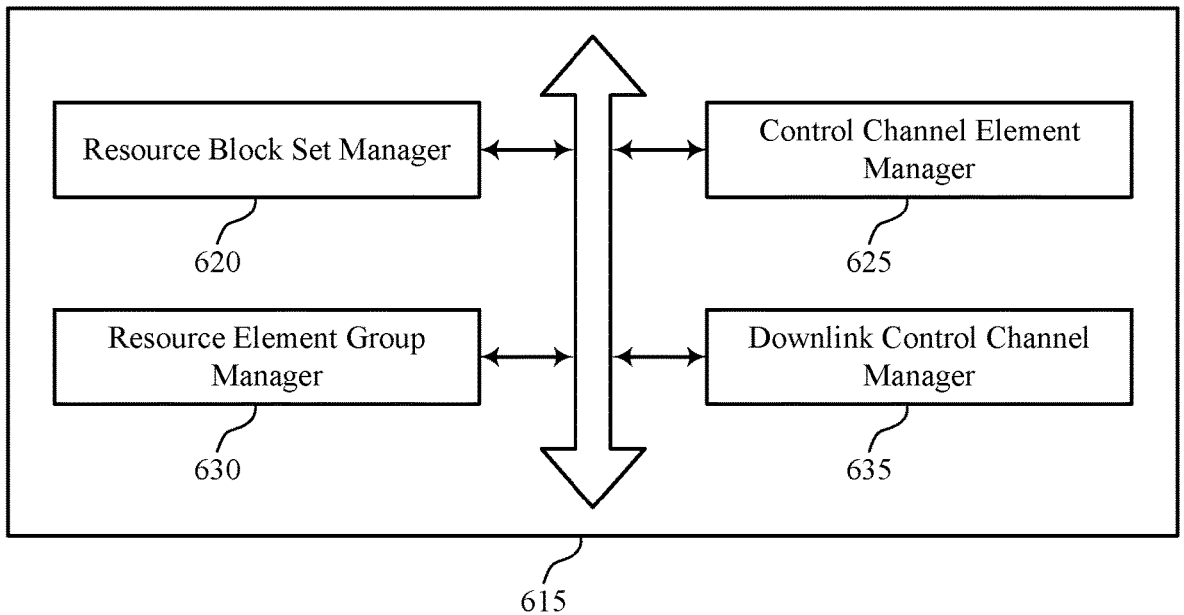

FIG. 6 shows a block diagram 600 of a base station communications manager 615 that supports resource element group mapping for a downlink control channel in accordance with aspects of the present disclosure. The base station communications manager 615 may be an example of aspects of a base station communications manager 415, a base station communications manager 515, or a base station communications manager 715 described with reference to FIGS. 4, 5, and 7. The base station communications manager 615 may include resource block set manager 620, control channel element manager 625, resource element group manager 630, and downlink control channel manager 635. Each of these modules may communicate, directly or indirectly, with one another (e.g., via one or more buses).

Resource block set manager 620 may identify control information for transmission on a downlink control channel RB set that is configured with one or more OFDM symbols.

Control channel element manager 625 may encode the control information into a set of CCEs.

Resource element group manager 630 may map each CCE of the set of CCEs to a corresponding unique set of REGs in the downlink control channel RB set using a mapping function such that the set of REGs is unique regardless of a number of OFDM symbols on which the downlink control channel RB set is configured, and where each of the one or more OFDM symbols is configured with a set of REGs. Resource element group manager 535 may allocate the downlink control channel RB set over the one or more OFDM symbols such that the set of REGs in each OFDM symbol is a multiple of a number of the set of CCEs. In some cases, mapping each CCE of the set of CCEs includes mapping each CCE of the set of CCEs such that each set of REGs is fully contained within a single OFDM symbol of the one or more OFDM symbols. In some examples, the mapping function may be a predetermined mapping function known to the base station and the UE.

In some cases, the mapping function includes a floor function of a CCE index divided by a number of the set of CCEs to be included in each OFDM symbol. In some cases, the mapping function is $$n \bmod CCE_{OS} + \left\lfloor \frac{n}{CCE_{OS}} \right\rfloor \cdot N_{sREG,m}^{OS} + i \cdot CCE_{OS},$$

where $$CCE_{OS} = \left\lfloor \frac{N_{sREG,m}^{OS}}{N_{sREG}^{sCCE}} \right\rfloor$$

and indicates the number of the set of CCEs to be included in each OFDM symbol, $N_{sREG,m}^{OS}$ indicates a number of the set of REGs to be included in each OFDM symbol, and $N_{sREG}^{sCCE}$ indicates a number of REGs to be included in each CCE, where $n \in \{0, 1, \ldots, k \cdot CCE_{OS}-1\}$, and k is a number of the OFDM symbols on which the downlink control channel RB set is configured, and where $i \in \{0, 1, \ldots, N_{sCCE,m}1\}$, and $N_{sCCE,m}$ indicates a number of the set of CCEs in the downlink control channel RB set.

Downlink control channel manager 635 may transmit the encoded control information using the downlink control channel RB set. In some cases, transmitting the encoded control information using the downlink control channel RB set includes transmitting the encoded control information on a CRS-based physical downlink control channel (PDCCH).

Figure 7:
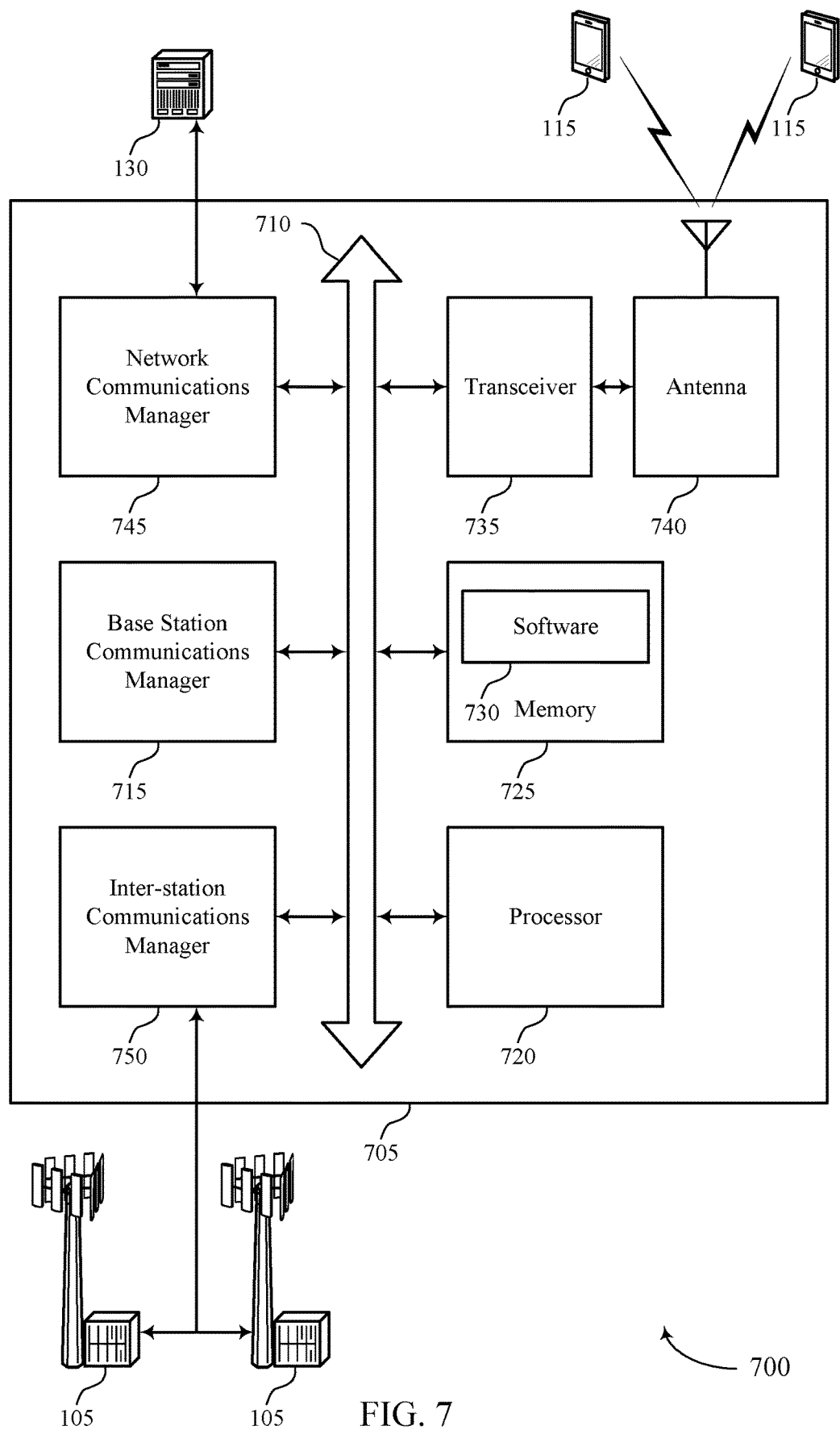
FIG. 7 illustrates a block diagram of a system including a base station that supports resource element group mapping for a downlink control channel in accordance with aspects of the present disclosure.

FIG. 7 shows a diagram of a system 700 including a device 705 that supports resource element group mapping for a downlink control channel in accordance with aspects of the present disclosure. Device 705 may be an example of or include the components of wireless device 405, wireless device 505, or a base station 105 as described above, e.g., with reference to FIGS. 4 and 5. Device 705 may include components for bi-directional voice and data communications including components for transmitting and receiving communications, including base station communications manager 715, processor 720, memory 725, software 730, transceiver 735, antenna 740, network communications manager 745, and inter-station communications manager 750. These components may be in electronic communication via one or more buses (e.g., bus 710). Device 705 may communicate wirelessly with one or more user equipment (UE)s 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting resource element group mapping for a downlink control channel).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support resource element group mapping for a downlink control channel. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

Network base station communications manager 745 may manage communications with the core network (e.g., via one or more wired backhaul links). For example, the network communications manager 745 may manage the transfer of data communications for client devices, such as one or more UEs 115.

Inter-station communications manager 750 may manage communications with other base station 105, and may include a controller or scheduler for controlling communications with UEs 115 in cooperation with other base stations 105. For example, the inter-station communications manager 750 may coordinate scheduling for transmissions to UEs 115 for various interference mitigation techniques such as beamforming or joint transmission. In some examples, inter-station communications manager 750 may provide an X2 interface within a Long Term Evolution (LTE)/LTE-A wireless communication network technology to provide communication between base stations 105.

Figure 8:
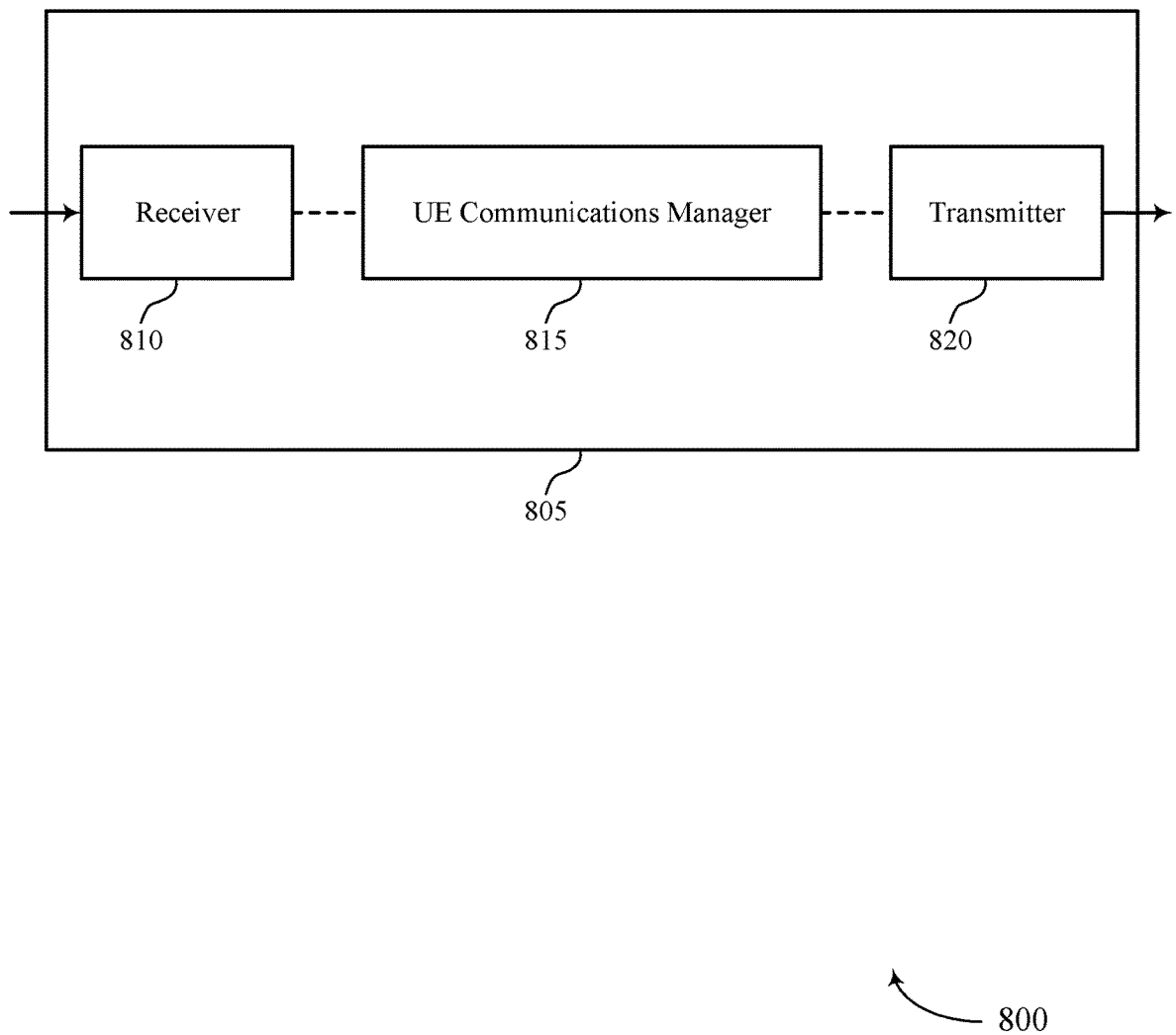
FIGS. 8 through 10 show block diagrams of a device that supports resource element group mapping for a downlink control channel in accordance with aspects of the present disclosure.

FIG. 8 shows a block diagram 800 of a wireless device 805 that supports resource element group mapping for a downlink control channel in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resource element group mapping for a downlink control channel, etc.). Information may be passed on to other components of the device. The receiver 810 may be an example of aspects of the transceiver 1120 described with reference to FIG. 11. The receiver 810 may utilize a single antenna or a set of antennas.

UE communications manager 815 may be an example of aspects of the UE communications manager 1110 described with reference to FIG. 11. UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive a downlink control channel resource block (RB) set that includes a set of control channel elements (CCEs) in one or more orthogonal frequency-division multiplexing (OFDM) symbols; de-map the set of CCEs from the downlink control channel RB set based on a mapping function, where each CCE is assigned to a corresponding unique set of resource element groups (REGs) in the downlink control channel RB set by the mapping function independent of a number of OFDM symbols on which the downlink control channel RB set is received and where each of the one or more OFDM symbols is configured with multiple REGs; and decode the set of CCEs into control information. In some examples, the mapping function may be a predetermined mapping function known to the base station and the UE.

Transmitter 820 may transmit signals generated by other components of the device. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
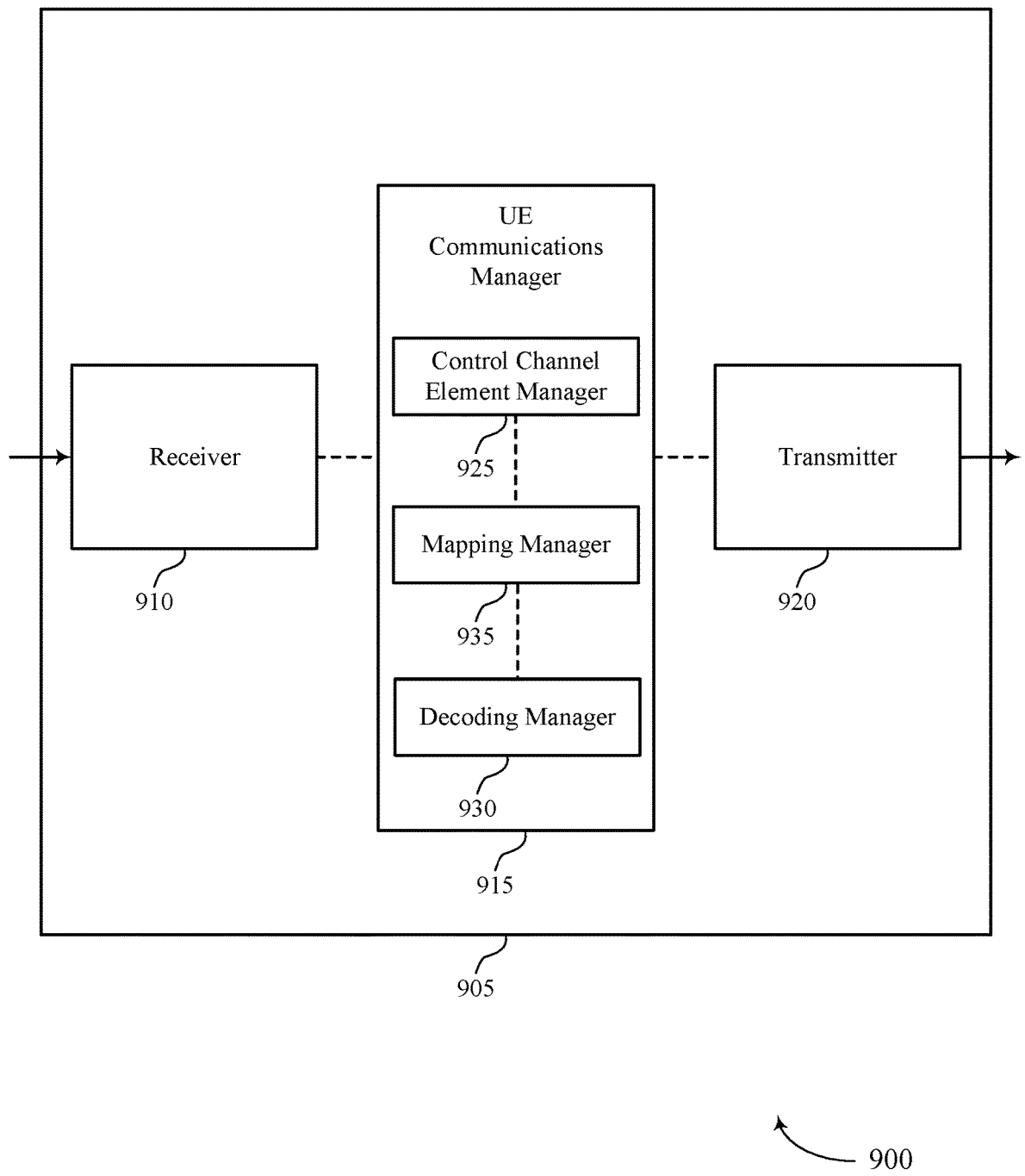

FIG. 9 shows a block diagram 900 of a wireless device 905 that supports resource element group mapping for a downlink control channel in accordance with aspects of the present disclosure. Wireless device 905 may be an example of aspects of a wireless device 405 or a base station 105 as described with reference to FIG. 4. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to resource element group mapping for a downlink control channel, etc.). Information may be passed on to other components of the device. The receiver 910 may be an example of aspects of the transceiver 1120 described with reference to FIG. 11. The receiver 910 may utilize a single antenna or a set of antennas.

UE communications manager 915 may be an example of aspects of the UE communications manager 1110 described with reference to FIG. 11. UE communications manager 915 may also include control channel element manager 925, mapping manager 935, and decoding manager 930.

Control channel element manager 925 may receive a downlink control channel resource block (RB) set that includes a set of control channel elements (CCEs) in one or more orthogonal frequency-division multiplexing (OFDM) symbols. In some cases, receiving the downlink control channel RB set includes receiving encoded control information on a cell-specific reference signal (CRS)-based PDCCH.

Mapping manager 935 may de-map the set of CCEs from the downlink control channel RB set based on a mapping function, where each CCE is assigned to a corresponding unique set of resource element groups (REGs) in the downlink control channel RB set by the mapping function independent of a number of OFDM symbols on which the downlink control channel RB set is received and where each of the one or more OFDM symbols is configured with multiple REGs. In some examples, the mapping function may be a predetermined mapping function known to the base station and the UE.

Decoding manager 930 may decode the CCEs into control information.

In some cases, de-mapping the CCEs includes de-mapping the CCEs from the corresponding unique set of REGs, and the mapping function includes a floor function of a CCE index divided by a number of CCEs included in each of the one or more OFDM symbols.

In some cases, the mapping function is $$n \bmod CCE_{OS} + \left\lfloor \frac{n}{CCE_{OS}} \right\rfloor \cdot N_{sREG,m}^{OS} + i \cdot CCE_{OS},$$

where $$CCE_{OS} = \left\lfloor \frac{N_{sREG,m}^{OS}}{N_{sREG}^{sCCE}} \right\rfloor$$

and indicates the number of the set of CCEs to be included in each OFDM symbol, $N_{sREG,m}^{OS}$ Indicates a Number of the Set of REGs to be Included in Each OFDM symbol, and $N_{sREG}^{sCCE}$ indicates a number of REGs to be included in each CCE, where $n \in \{0, 1, \ldots, k \cdot CCE_{OS}-1\}$, and k is a number of the OFDM symbols on which the downlink control channel RB set is configured, and where $i \in \{0, 1, \ldots, N_{sCCE,m}-1\}$, and $N_{sCCE,m}$ indicates a number of the set of CCEs in the downlink control channel RB set.

Transmitter 920 may transmit signals generated by other components of the device. In some examples, the transmitter 920 may be collocated with a receiver 910 in a transceiver module. For example, the transmitter 920 may be an example of aspects of the transceiver 1120 described with reference to FIG. 11. The transmitter 920 may utilize a single antenna or a set of antennas.

Figure 10:
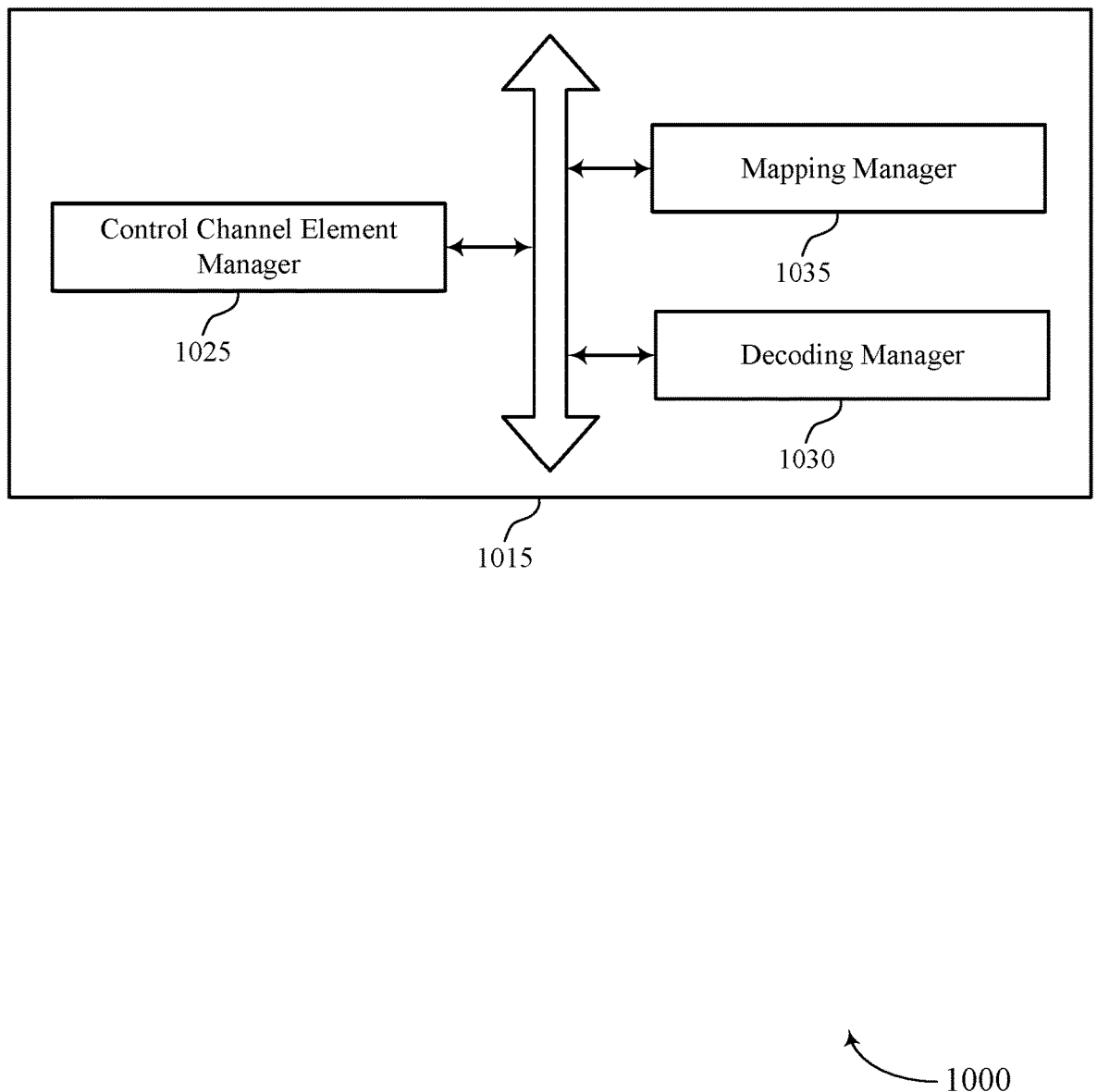

FIG. 10 shows a block diagram 1000 of a UE communications manager 1015 that supports resource element group mapping for a downlink control channel in accordance with aspects of the present disclosure. The UE communications manager 1015 may be an example of aspects of a UE communications manager 815, a UE communications manager 915, or a UE communications manager 1110 described with reference to FIGS. 8, 9, and 11. The UE communications manager 1015 may include control channel element manager 1025, mapping manager 1035, and decoding manager 1030. Each of these modules may communicate, directly or indirectly, with one another (e.g., via one or more buses).

Control channel element manager 1025 may receive a downlink control channel resource block (RB) set that includes a set of control channel elements (CCEs) in one or more orthogonal frequency-division multiplexing (OFDM) symbols. In some cases, receiving the downlink control channel RB set includes receiving encoded control information on a cell-specific reference signal (CRS)-based PDCCH.

Mapping manager 1035 may de-map the set of CCEs from the downlink control channel RB set based on a mapping function, where each CCE is assigned to a corresponding unique set of resource element groups (REGs) in the downlink control channel RB set by the mapping function independent of a number of OFDM symbols on which the downlink control channel RB set is received and where each of the one or more OFDM symbols is configured with multiple REGs. In some examples, the mapping function may be a predetermined mapping function known to the base station and the UE.

Decoding manager 1030 may decode the CCEs into control information.

In some cases, de-mapping the CCEs includes de-mapping the CCEs from the corresponding unique set of REGs, and the mapping function includes a floor function of a CCE index divided by a number of CCEs included in each of the one or more OFDM symbols.

In some cases, the mapping function is $$n \bmod CCE_{OS} + \left\lfloor \frac{n}{CCE_{OS}} \right\rfloor \cdot N_{sREG,m}^{OS} + i \cdot CCE_{OS},$$

where $$CCE_{OS} = \left\lfloor \frac{N_{sREG,m}^{OS}}{N_{sREG}^{sCCE}} \right\rfloor$$

and indicates the number of the set of CCEs to be included in each OFDM symbol, $N_{sREG,m}^{OS}$ indicates a number of the set of REGs to be included in each OFDM symbol, and $N_{sREG}^{sCCE}$ indicates a number of REGs to be included in each CCE, where $n \in \{0, 1, \ldots, k \cdot CCE_{OS}-1\}$, and k is a number of the OFDM symbols on which the downlink control channel RB set is configured, and where $i \in \{0, 1, \ldots, N_{sCCE,m}-1\}$, and $N_{sCCE,m}$ indicates a number of the set of CCEs in the downlink control channel RB set.

Figure 11:
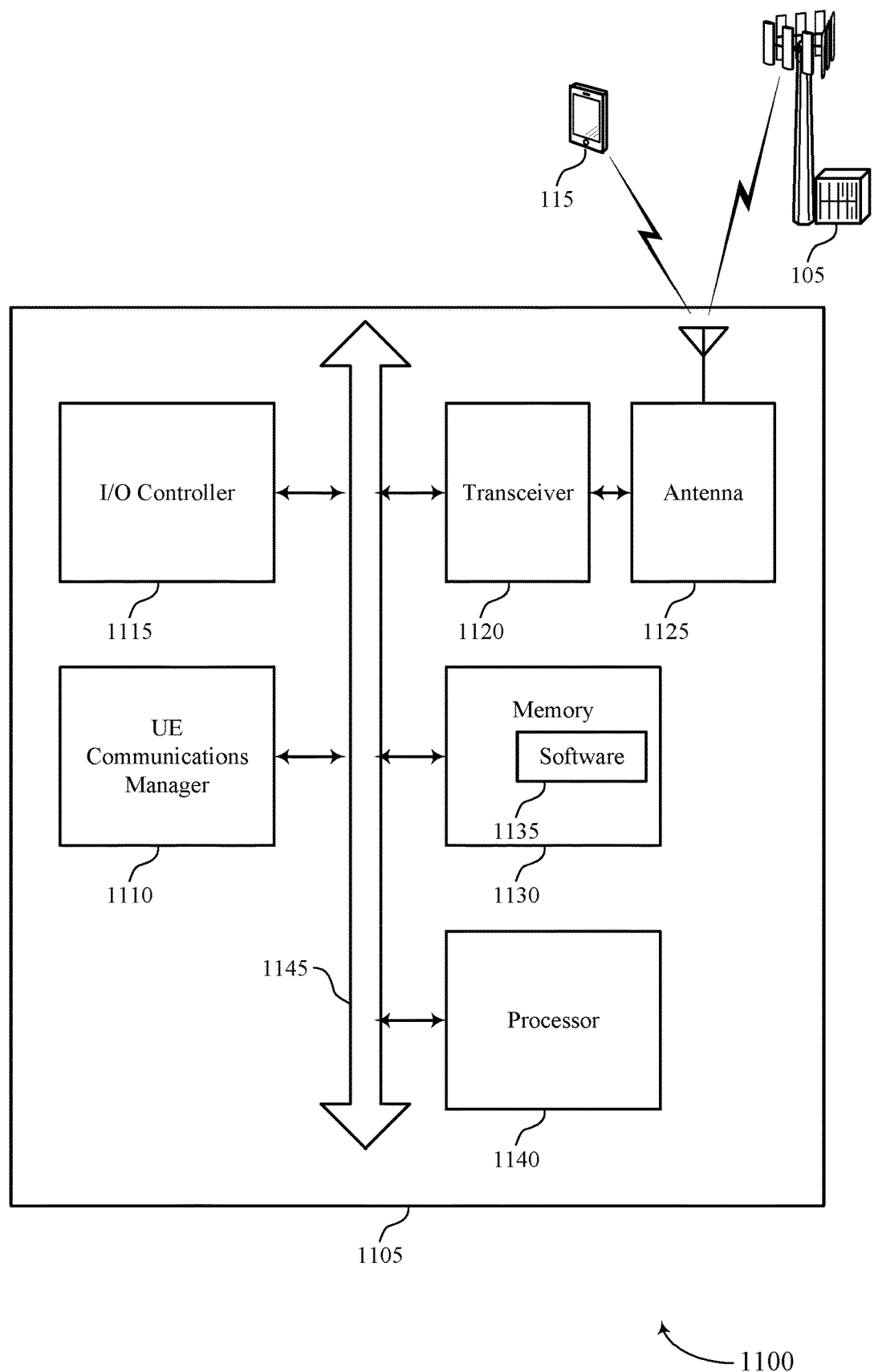
FIG. 11 illustrates a block diagram of a system including a user equipment that supports resource element group mapping for a downlink control channel in accordance with aspects of the present disclosure.

FIG. 11 shows a diagram of a system 1100 including a device 1105 that supports resource element group mapping for a downlink control channel in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE communications manager 1110, processor 1140, memory 1130, software 1135, transceiver 1120, and antenna 1125. These components may be in electronic communication via one or more buses (e.g., bus 1145). Device 1105 may communicate wirelessly with one or more base stations 105.

Processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1140 may be configured to operate a memory array using a memory controller. In other cases, a memory controller may be integrated into processor 1140. Processor 1140 may be configured to execute computer-readable instructions stored in a memory to perform various functions (e.g., functions or tasks supporting resource element group mapping for a downlink control channel).

Memory 1130 may include random access memory (RAM) and read only memory (ROM). The memory 1130 may store computer-readable, computer-executable software 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

Software 1135 may include code to implement aspects of the present disclosure, including code to support resource element group mapping for a downlink control channel. Software 1135 may be stored in a non-transitory computer-readable medium such as system memory or other memory. In some cases, the software 1135 may not be directly executable by the processor but may cause a computer (e.g., when compiled and executed) to perform functions described herein.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

Figure 12:
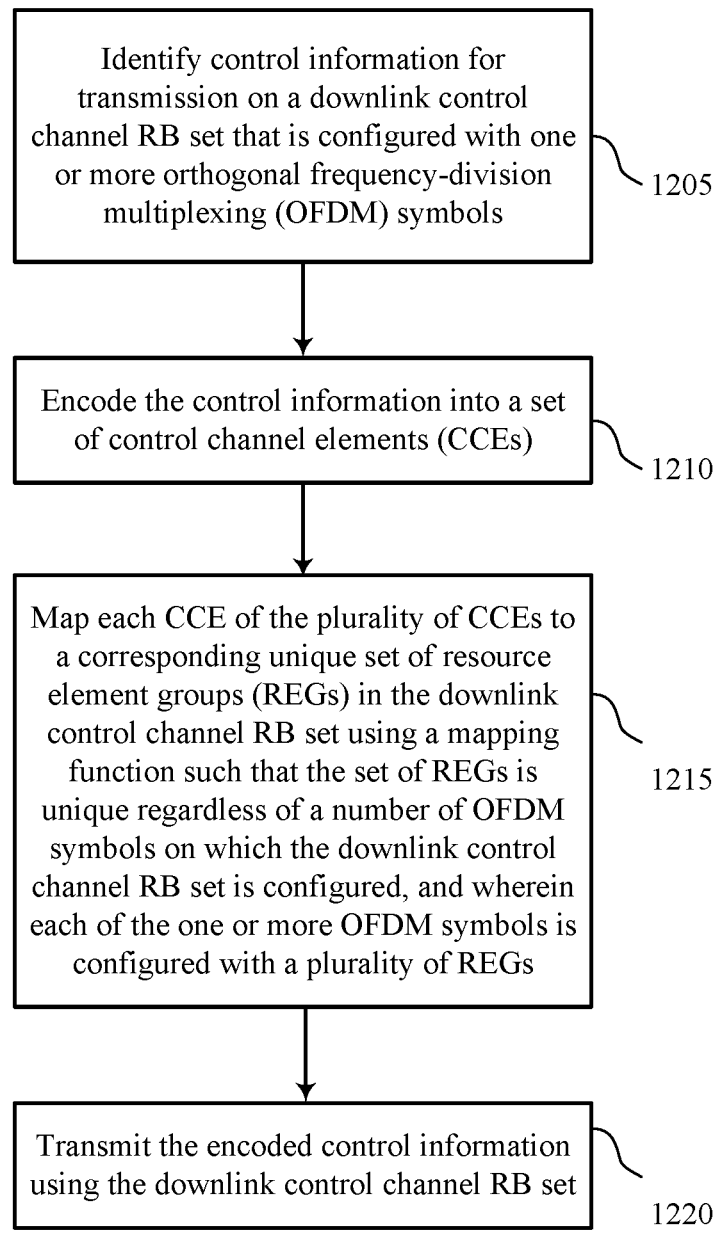
FIGS. 12 through 13 illustrate methods for resource element group mapping and decoding for a downlink control channel in accordance with aspects of the present disclosure.

FIG. 12 shows a flowchart illustrating a method 1200 for resource element group mapping for a downlink control channel, such as for a distributed sPDCCH RB set, in accordance with aspects of the present disclosure. The operations of method 1200 may be implemented by a base station 105 or its components as described herein. For example, the operations of method 1200 may be performed by a base station communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At 1205 the base station 105 may identify control information for transmission on a downlink control channel RB set that is configured with one or more OFDM symbols. The operations of 1205 may be performed according to the methods described herein. In certain examples, aspects of the operations of 1205 may be performed by a resource block set manager as described with reference to FIGS. 4 through 7.

At 1210 the base station 105 may encode the control information into a set of CCEs. The operations of 1210 may be performed according to the methods described herein. In certain examples, aspects of the operations of 1210 may be performed by a control channel element manager as described with reference to FIGS. 4 through 7.

At 1215 the base station 105 may map each CCE of the set of CCEs to a corresponding unique set of REGs in the downlink control channel RB set using a mapping function such that the set of REGs is unique regardless of a number of OFDM symbols on which the downlink control channel RB set is configured, and where each of the one or more OFDM symbols is configured with a set of REGs. The operations of 1215 may be performed according to the methods described herein. In certain examples, aspects of the operations of 1215 may be performed by a resource element group manager as described with reference to FIGS. 4 through 7.

At 1220 the base station 105 may transmit the encoded control information using the downlink control channel RB set. The operations of 1220 may be performed according to the methods described herein. In certain examples, aspects of the operations of 1220 may be performed by a downlink control channel manager as described with reference to FIGS. 4 through 7.

Figure 13:
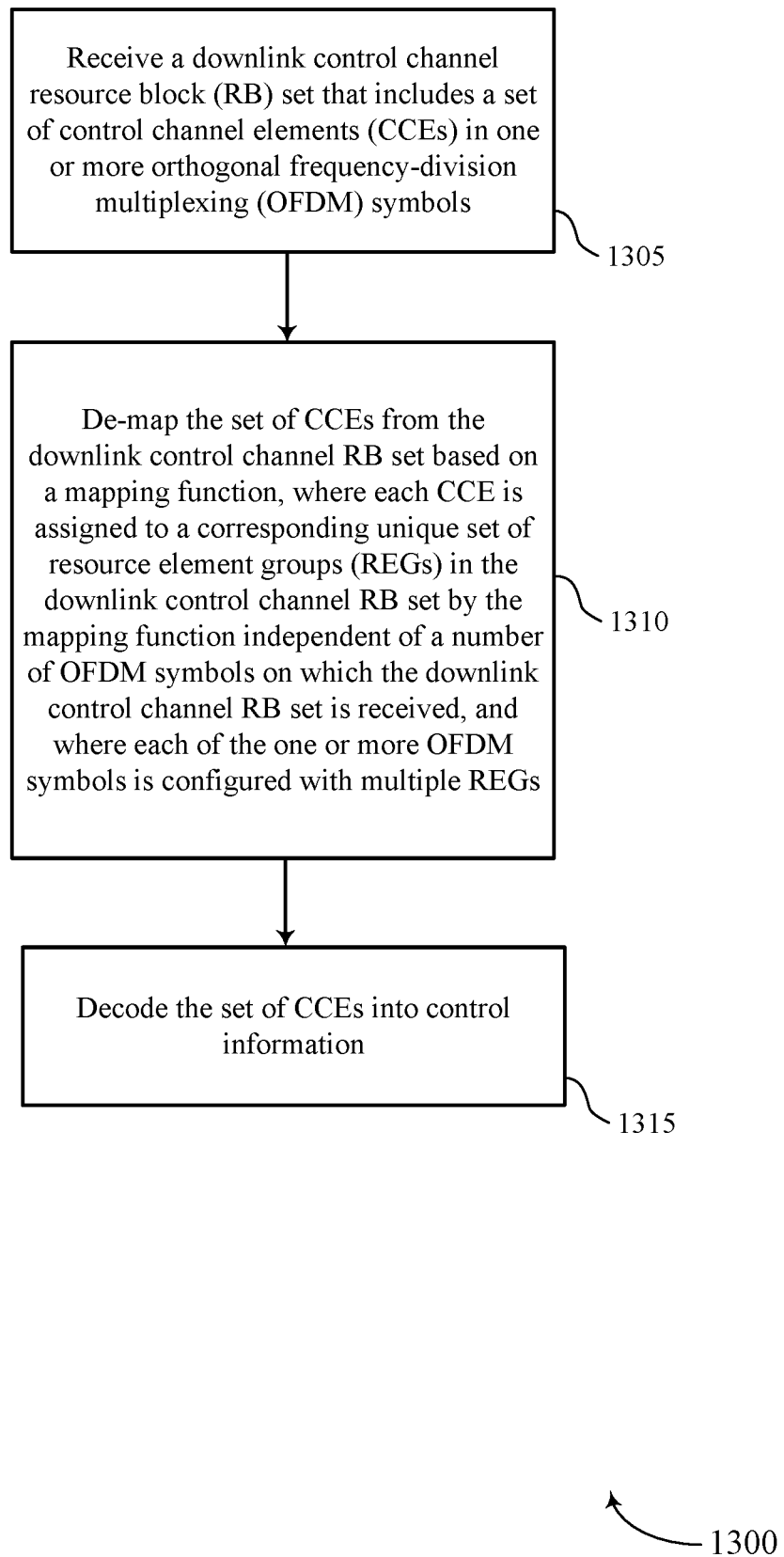

FIG. 13 shows a flowchart illustrating a method 1300 for resource element group mapping for a downlink control channel, such as for a distributed sPDCCH RB set, in accordance with aspects of the present disclosure. The operations of method 1300 may be implemented by a UE 115 or its components as described herein. For example, the operations of method 1300 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive a downlink control channel resource block (RB) set that includes a set of control channel elements (CCEs) in one or more orthogonal frequency-division multiplexing (OFDM) symbols. In some cases, receiving the downlink control channel RB set includes receiving encoded control information on a cell-specific reference signal (CRS)-based PDCCH. The operations of 1305 may be performed according to the methods described herein. In certain examples, aspects of the operations of 1305 may be performed by a control channel element manager as described with reference to FIGS. 8 through 11.

At 1310 the UE 115 may de-map the set of CCEs from the downlink control channel RB set based on (e.g., using) a mapping function, where each CCE is assigned to a corresponding unique set of resource element groups (REGs) in the downlink control channel RB set by the mapping function independent of a number of OFDM symbols on which the downlink control channel RB set is received, and where each of the one or more OFDM symbols is configured with multiple REGs. The operations of 1310 may be performed according to the methods described herein. In certain examples, aspects of the operations of 1310 may be performed by a mapping manager as described with reference to FIGS. 8 through 11.

At 1315 the UE 115 may decode the set of CCEs into control information. The operations of 1315 may be performed according to the methods described herein. In certain examples, aspects of the operations of 1315 may be performed by a decoding manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
    identifying control information for transmission on a downlink control channel resource block (RB) set that is configured with one or more orthogonal frequency-division multiplexing (OFDM) symbols;
    encoding the control information into a plurality of control channel elements (CCEs);
    mapping each CCE of the plurality of CCEs to a corresponding unique set of resource element groups (REGs) in the downlink control channel RB set using a mapping function such that the set of REGs is unique regardless of a number of OFDM symbols on which the downlink control channel RB set is configured, wherein each of the one or more OFDM symbols is configured with a plurality of REGs, wherein the mapping function comprises a first floor function of a number of the plurality of REGs to be included in each OFDM symbol of the one or more OFDM symbols divided by a number of REGs to be included in each CCE of the plurality of CCEs, and wherein the mapping function further comprises a second floor function of a CCE index divided by a result of the first floor function; and
    transmitting the encoded control information using the downlink control channel RB set.

2. The method of claim 1, wherein mapping each CCE of the plurality of CCEs comprises:
    mapping each CCE of the plurality of CCEs such that each corresponding set of REGs is fully contained within a single OFDM symbol of the one or more OFDM symbols.

3. The method of claim 1, further comprising:
    allocating the downlink control channel RB set over the one or more OFDM symbols such that the plurality of REGs in each OFDM symbol is a multiple of a number of the plurality of CCEs.

4. The method of claim 1, wherein the mapping function is:

$$n \bmod CCE_{OS} + \left\lfloor \frac{n}{CCE_{OS}} \right\rfloor \cdot N_{sREG,m}^{OS} + i \cdot CCE_{OS}$$

where $$CCE_{OS} = \left\lfloor \frac{N_{sREG,m}^{OS}}{N_{sREG}^{sCCE}} \right\rfloor$$

and indicates a number of the plurality of CCEs to be included in each OFDM symbol of the one or more OFDM symbols, $N_{sREG,m}^{OS}$ indicates the number of the plurality of REGs to be included in each OFDM symbol, and $N_{sREG}^{sCCE}$ indicates the number of REGs to be included in each CCE,
    where $n \in \{0, 1, \ldots, k \cdot CCE_{OS}-1\}$, and k is a number of OFDM symbols on which the downlink control channel RB set is configured, and
    where $i \in \{0, 1, \ldots N_{sREG}^{sCCE}-1\}$.

5. The method of claim 1, wherein transmitting the encoded control information using the downlink control channel RB set comprises:
    transmitting the encoded control information on a cell-specific reference signal (CRS)-based physical downlink control channel (PDCCH).

6. The method of claim 1, wherein the result of the first floor function comprises a number of the plurality of CCEs to be included in each OFDM symbol of the one or more OFDM symbols.

7. A method for wireless communication, comprising:
    receiving a downlink control channel resource block (RB) set that includes a plurality of control channel elements (CCEs) in one or more orthogonal frequency-division multiplexing (OFDM) symbols;
    de-mapping the plurality of CCEs from the downlink control channel RB set based at least in part on a mapping function that comprises a first floor function of a number of the plurality of REGs to be included in each OFDM symbol of the one or more OFDM symbols divided by a number of REGs to be included in each CCE of the plurality of CCEs, wherein the mapping function further comprises a second floor function of a CCE index divided by a result of the first floor function, and wherein each CCE is assigned to a corresponding unique set of resource element groups (REGs) in the downlink control channel RB set by the mapping function independent of a number of OFDM symbols on which the downlink control channel RB set is received and wherein each of the one or more OFDM symbols is configured with a plurality of REGs; and
    decoding the plurality of CCEs into control information.

8. The method of claim 7, wherein de-mapping the plurality of CCEs comprises:
    de-mapping the CCEs from the corresponding unique set of REGs.

9. The method of claim 7, wherein the mapping function is:

$$n \bmod CCE_{OS} + \left\lfloor \frac{n}{CCE_{OS}} \right\rfloor \cdot N_{sREG,m}^{OS} + i \cdot CCE_{OS}$$

where $$CCE_{OS} = \left\lfloor \frac{N_{sREG,m}^{OS}}{N_{sREG}^{sCCE}} \right\rfloor$$

and indicates a number of the plurality of CCEs to be included in each OFDM symbol of the one or more OFDM symbols, $N_{sREG,m}^{OS}$ indicates the number of the plurality of REGs to be included in each OFDM symbol, and $N_{sREG}^{sCCE}$ indicates the number of REGs to be included in each CCE, where $n \in \{0, 1, \ldots, k \cdot CCE_{OS}-1\}$, and k is a number of OFDM symbols on which the downlink control channel RB set is configured, and where $i \in \{0, 1, \ldots, N_{sREG}^{sCCE}-1\}$.

10. The method of claim 7, wherein receiving the downlink control channel RB set comprises:
receiving encoded control information on a cell-specific reference signal (CRS)-based physical downlink control channel (PDCCH).

11. The method of claim 7, wherein the result of the first floor function comprises a number of the plurality of CCEs to be included in each OFDM symbol of the one or more OFDM symbols.

12. An apparatus for wireless communication, comprising:
a processor,
memory coupled with the processor; and
instructions stored in the memory and executable by the processor to cause the apparatus to:
identify control information for transmission on a downlink control channel resource block (RB) set that is configured with one or more orthogonal frequency-division multiplexing (OFDM) symbols;
encode the control information into a plurality of control channel elements (CCEs);
map each CCE of the plurality of CCEs to a corresponding unique set of resource element groups (REGs) in the downlink control channel RB set using a mapping function such that the set of REGs is unique regardless of a number of OFDM symbols on which the downlink control channel RB set is configured, wherein each of the one or more OFDM symbols is configured with a plurality of REGs, wherein the mapping function comprises a first floor function of a number of the plurality of REGs to be included in each OFDM symbol of the one or more OFDM symbols divided by a number of REGs to be included in each CCE of the plurality of CCEs, and wherein the mapping function further comprises a second floor function of a CCE index divided by a result of the first floor function; and
transmit the encoded control information using the downlink control channel RB set.

13. The apparatus of claim 12, wherein the instructions to map each CCE of the plurality of CCEs are executable by the processor to cause the apparatus to:
map each CCE of the plurality of CCEs such that each corresponding set of REGs is fully contained within a single OFDM symbol of the one or more OFDM symbols.

14. The apparatus of claim 12, wherein the instructions are further executable by the processor to cause the apparatus to:
allocate the downlink control channel RB set over the one or more OFDM symbols such that the plurality of REGs in each OFDM symbol is a multiple of a number of the plurality of CCEs.

15. The apparatus of claim 12, wherein the mapping function is:

$$n \bmod CCE_{OS} + \left\lfloor \frac{n}{CCE_{OS}} \right\rfloor \cdot N_{sREG,m}^{OS} + i \cdot CCE_{OS}$$

where $$CCE_{OS} = \left\lfloor \frac{N_{sREG,m}^{OS}}{N_{sREG}^{sCCE}} \right\rfloor$$

and indicates a number of the plurality of CCEs to be included in each OFDM symbol of the one or more OFDM symbols, $N_{sREG,m}^{OS}$ indicates the number of the plurality of REGs to be included in each OFDM symbol, and $N_{sREG}^{sCCE}$ indicates the number of REGs to be included in each CCE, where $n \in \{0, 1, \ldots, k \cdot CCE_{OS}-1\}$, and k is a number of OFDM symbols on which the downlink control channel RB set is configured, and where $i \in \{0, 1, \ldots, N_{sREG}^{sCCE}-1\}$.

16. The apparatus of claim 12, wherein the instructions to transmit the encoded control information using the downlink control channel RB set are executable by the processor to cause the apparatus to:
transmit the encoded control information on a cell-specific reference signal (CRS)-based physical downlink control channel (PDCCH).

17. An apparatus for wireless communication, comprising:
a processor,
memory coupled with the processor; and
instructions stored in the memory and executable by the processor to cause the apparatus to:
receive a downlink control channel resource block (RB) set that includes a plurality of control channel elements (CCEs) in one or more orthogonal frequency-division multiplexing (OFDM) symbols;
de-map the plurality of CCEs from the downlink control channel RB set based at least in part on a mapping function that comprises a first floor function of a number of the plurality of REGs to be included in each OFDM symbol of the one or more OFDM symbols divided by a number of REGs to be included in each CCE of the plurality of CCEs, wherein the mapping function further comprises a second floor function of a CCE index divided by a result of the first floor function, and wherein each CCE is assigned to a corresponding unique set of resource element groups (REGs) in the downlink control channel RB set by the mapping function independent of a number of OFDM symbols on which the downlink control channel RB set is received and wherein each of the one or more OFDM symbols is configured with a plurality of REGs; and
decode the plurality of CCEs into control information.

18. The apparatus of claim 17, wherein the instructions to de-map the plurality of CCEs are executable by the processor to cause the apparatus to:

de-map the CCEs from the corresponding unique set of REGs.

19. The apparatus of claim 17, wherein the mapping function is:

$$n \bmod CCE_{OS} + \left\lfloor \frac{n}{CCE_{OS}} \right\rfloor \cdot N^{OS}_{sREG,m} + i \cdot CCE_{OS}$$

where $$CCE_{OS} = \left\lfloor \frac{N^{OS}_{sREG,m}}{N^{sCCE}_{sREG}} \right\rfloor$$

and indicates a number of the plurality of CCEs to be included in each OFDM symbol of the one or more OFDM symbols, $N^{OS}_{sREG,m}$ indicates the number of the plurality of REGs to be included in each OFDM symbol, and $N^{sCCE}_{sREG}$ indicates the number of REGs to be included in each CCE, where n∈{0, 1, . . . , k·CCE$_{OS}$−1}, and k is a number of OFDM symbols on which the downlink control channel RB set is configured, and where i∈{0, 1, . . . , $N^{sCCE}_{sREG}$−1}.

20. The apparatus of claim 17, wherein the instructions to receive the downlink control channel RB set are executable by the processor to cause the apparatus to:

receive encoded control information on a cell-specific reference signal (CRS)-based physical downlink control channel (PDCCH).

* * * * *